(12) United States Patent
Gou et al.

(10) Patent No.: US 10,169,108 B2
(45) Date of Patent: Jan. 1, 2019

(54) SPECULATIVE EXECUTION MANAGEMENT IN A COHERENT ACCELERATOR ARCHITECTURE

(71) Applicant: International Business Machines Corporation, Armonk, NY (US)

(72) Inventors: Pengfei Gou, Shanghai (CN); Yang Liu, Shanghai (CN); Yangfan Liu, Shanghai (CN); Zhenpeng Zuo, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/845,836

(22) Filed: Dec. 18, 2017

(65) Prior Publication Data

US 2018/0267842 A1  Sep. 20, 2018

Related U.S. Application Data

(63) Continuation of application No. 15/461,428, filed on Mar. 16, 2017.

(51) Int. Cl.
*G06F 11/14* (2006.01)
*G06F 9/52* (2006.01)
(Continued)

(52) U.S. Cl.
CPC .......... *G06F 9/528* (2013.01); *G06F 11/1407* (2013.01); *G06F 12/0815* (2013.01);
(Continued)

(58) Field of Classification Search
CPC .. G06F 9/528; G06F 11/1407; G06F 12/0815; G06F 13/1663
See application file for complete search history.

(56) References Cited

U.S. PATENT DOCUMENTS 8,521,961 B2  8/2013  Eichenberger et al.
2004/0153576 A1*  8/2004  Hansmann ........ G06F 17/30902
709/248

(Continued)

FOREIGN PATENT DOCUMENTS

GB  2485083 B  12/2016

OTHER PUBLICATIONS

Gou et al., "Speculative Execution Management in a Coherent Accelerator Architecture," U.S. Appl. No. 15/461,428, filed Mar. 16, 2017.

(Continued)

*Primary Examiner* — Ryan Bertram
*Assistant Examiner* — Trang K Ta
(74) *Attorney, Agent, or Firm* — James L. Olsen

(57) ABSTRACT

Disclosed aspects relate to speculative execution management in a coherent accelerator architecture. A first access request from a first component may be detected with respect to a set of memory spaces of a single shared memory in the coherent accelerator architecture. A second access request from a second component may be detected with respect to the set of memory spaces of the single shared memory in the coherent accelerator architecture. The first and second access requests may be processed by a speculative execution management engine using a speculative execution technique with respect to the set of memory spaces of the single shared memory in the coherent accelerator architecture.

1 Claim, 15 Drawing Sheets

(51) Int. Cl.
*G06F 13/42* (2006.01)
*G06F 13/16* (2006.01)
*G06F 12/0815* (2016.01)

(52) U.S. Cl.
CPC ...... *G06F 13/1663* (2013.01); *G06F 13/4265* (2013.01); *G06F 2212/621* (2013.01)

(56) References Cited

U.S. PATENT DOCUMENTS

| | | |
|---|---|---|
| 2011/0016470 A1 | 1/2011 | Cain, III et al. |
| 2011/0047334 A1 | 2/2011 | Eichenberger et al. |
| 2015/0242248 A1 | 8/2015 | Busaba et al. |
| 2016/0179586 A1 | 6/2016 | Wang et al. |
| 2016/0357556 A1 | 12/2016 | Ould-Ahmed-Vall et al. |
| 2016/0378465 A1 | 12/2016 | Venkatesh et al. |
| 2017/0235638 A1* | 8/2017 | Knauth ............... G06F 11/1407 710/313 |

OTHER PUBLICATIONS

List of IBM Patents or Patent Applications Treated as Related, Signed Dec. 18, 2017, 2 pages.

* cited by examiner

1100

SPECULATIVE EXECUTION MANAGEMENT IN A COHERENT ACCELERATOR ARCHITECTURE

BACKGROUND

This disclosure relates generally to computer systems and, more particularly, relates to speculative execution management in a coherent accelerator architecture. Application programs may be used to carry out a variety of functions. The amount of access requests to be processed in application programs is increasing. As the amount of access requests increases, the need for speculative execution management in a coherent accelerator architecture may also increase.

SUMMARY

Aspects of the disclosure relate to speculative execution management in a coherent accelerator architecture. A speculative execution technique may be performed in a coherent accelerator architecture context to manage coherent bus utilization and coherent accelerator resources. A checkpoint may be set to capture the state of a shared cache at a particular point in time. Multiple functional units may be allowed to access the same shared cache to carry-out access requests. In the event that a conflict between multiple functional units is detected, the state of the shared cache may be rolled-back to the previous state captured by the checkpoint. The access requests may be retried with respect to the shared cache. In the event that a conflict is not detected, cache lines modified by the access requests may be written back to a coherent host memory directory in a batch fashion.

Disclosed aspects relate to speculative execution management in a coherent accelerator architecture. A first access request from a first component may be detected with respect to a set of memory spaces of a single shared memory in the coherent accelerator architecture. A second access request from a second component may be detected with respect to the set of memory spaces of the single shared memory in the coherent accelerator architecture. The first and second access requests may be processed by a speculative execution management engine using a speculative execution technique with respect to the set of memory spaces of the single shared memory in the coherent accelerator architecture.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
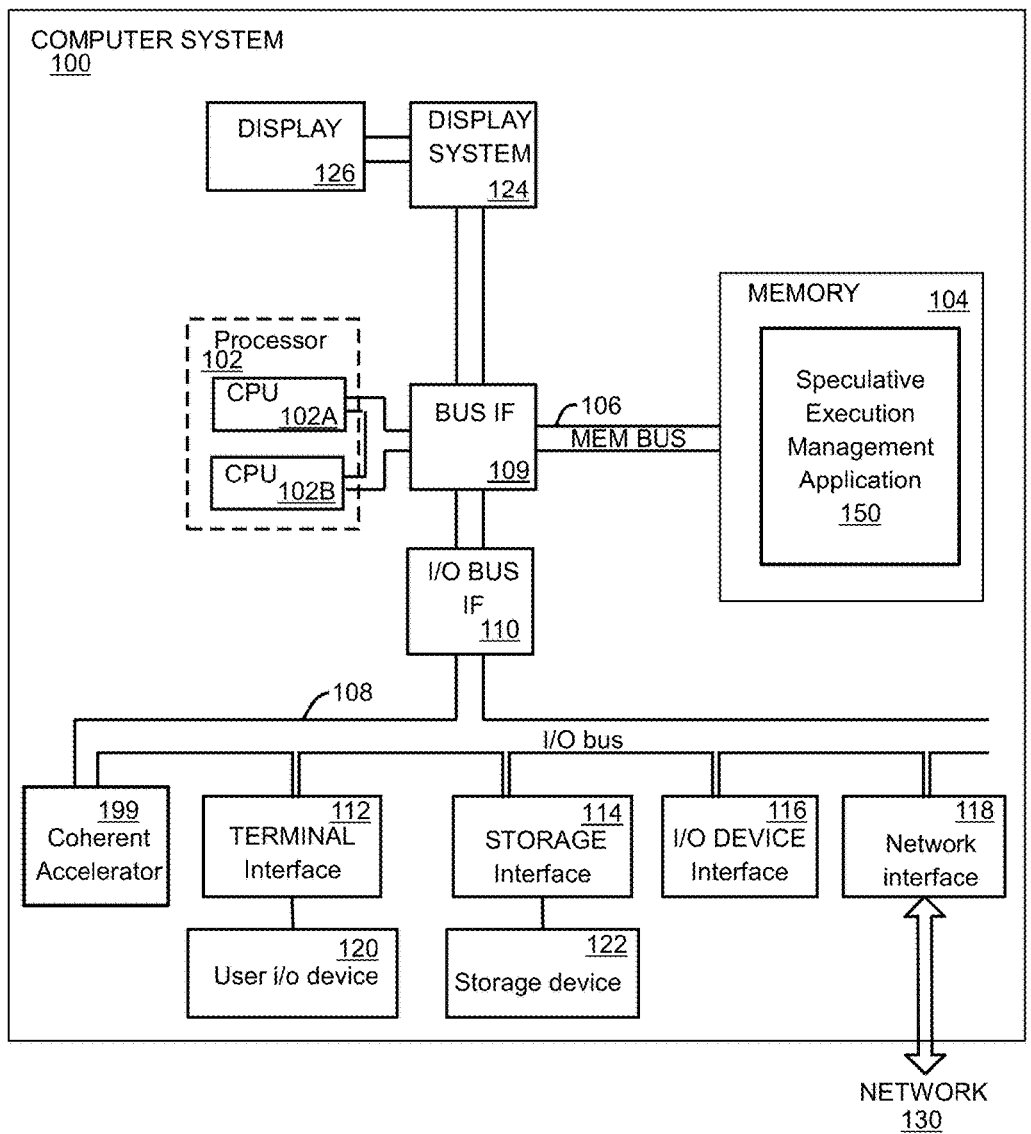
FIG. 1 depicts a high-level block diagram of a computer system for implementing various embodiments of the present disclosure, according to embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the disclosure relate to speculative execution management in a coherent accelerator architecture. A speculative execution technique may be performed in a coherent accelerator architecture context to manage coherent bus utilization and coherent accelerator resources. A checkpoint may be set to capture the state of a shared cache at a particular point in time. Multiple functional units (e.g., accelerator function units, processors) may be allowed to access the same shared cache (e.g., simultaneously) to carry-out access requests. In the event that a conflict between multiple functional units is detected (e.g., multiple functional units attempted to access the same shared cache line at the same time), the state of the shared cache may be rolled-back to the previous state captured by the checkpoint. The access requests may be retried with respect to the shared cache. In the event that a conflict is not detected (e.g., multiple functional units did not attempt to access the same shared cache line at the same time), cache lines modified by the access requests may be written back to a coherent host memory directory (e.g., main memory) in a batch fashion (e.g., all at once). Leveraging a speculative execution technique with respect to a coherent accelerator architecture context may be associated with benefits for cache availability, access request performance, and coherent accelerator resource usage efficiency.

Within coherent accelerator architectures, multiple functional units (e.g., accelerator function units, processors) may share access to the same common cache. The coherent accelerator may make use of "lock" and "unlock" techniques to manage access to the shared cache to prevent conflicts between multiple functional units from accessing (e.g., reading or writing to) the same cache lines of the shared cache at the same time. Aspects of the disclosure relate to the recognition that, in some situations, the use of "lock" and "unlock" techniques may result in congestion, stalls, or system slowdown as multiple functional units wait for their turn to access the shared cache. Accordingly, aspects of the disclosure relate to utilizing a speculative execution technique to allow multiple functional units to access the shared cache (e.g., at the same time). In the event of a conflict, the state of the shared cache may be rolled-back to a previous state captured by a checkpoint, and the access requests may be retried. In the event that a conflict does not occur, the modified cache lines may be written back to a host memory directory in a batch fashion (e.g., all at once, rather than one at a time). As such, access requests with respect to the shared cache may be performed in a parallel fashion, promoting task performance, shared cache availability, and coherent accelerator resource usage efficiency.

Consider the following example. There may be two or more tasks processing by different AFUs and CPUs. A first task may be processing by a first component and a second task may be processing by a second component. The first task may include many cache line access requests during the task processing period. The second task may also include many cache line access requests during the task process period. For instance, the first component may include an accelerator function unit (AFU), and the second component may include a central processing unit (CPU). The first task may be processed in the AFU and the second task may be processed in the CPU. The first task may access cache line 10-20, 30-40 during the task process and the second task may access cache line 0-9, 35-45 during the task process.

A write bit and a read bit may be added to the cache line structure for each cache line in coherent accelerators. When any cache line operation behaviors are performed, the write bit and read bit in the cache line will be set. When any cache line access requests happen, there will be a checking or detecting engine to process or to check whether there is a conflict. The conflict may include one or more of a write-read conflict, a read-write conflict or a write-write conflict (e.g., read-read behavior may not cause a conflict). As such, aspects of the disclosure relate to recording access behavior at completion of an access request to a cache line and detecting conflicts at the beginning of access behavior.

Aspects of the disclosure relate to a system, method, and computer program product for speculative execution management in a coherent accelerator architecture. A first access request from a first component may be detected with respect to a set of memory spaces of a single shared memory in the coherent accelerator architecture. A second access request from a second component may be detected with respect to the set of memory spaces of the single shared memory in the coherent accelerator architecture. The first and second access requests may be processed by a speculative execution management engine using a speculative execution technique with respect to the set of memory spaces of the single shared memory in the coherent accelerator architecture.

In embodiments, the speculative execution technique may be configured without a lock mechanism when processing the first and second access requests with respect to the set of memory spaces of the single shared memory in the coherent accelerator architecture. In embodiments, the first and second access requests may be evaluated with respect to the set of memory spaces of the single shared memory in the coherent accelerator architecture, a conflict absence may be determined based on the first and second access requests with respect to the set of memory spaces of the single shared memory, and a host memory directory may be updated in response to determining the conflict absence. In embodiments, the first and second access requests may be evaluated with respect to the set of memory spaces of the single shared memory in the coherent accelerator architecture, a conflict presence may be determined based on the first and second access requests with respect to the set of memory spaces of the single shared memory, and the coherent accelerator architecture may be rolled-back to a prior state in response to determining the conflict presence. Altogether, aspects of the disclosure can have performance or efficiency benefits. Aspects may save resources such as bandwidth, disk, processing, or memory.

Turning now to the figures, FIG. 1 depicts a high-level block diagram of a computer system for implementing various embodiments of the present disclosure, according to embodiments. The mechanisms and apparatus of the various embodiments disclosed herein apply equally to any appropriate computing system. The major components of the computer system 100 include one or more processors 102, a memory 104, a terminal interface 112, a storage interface 114, an I/O (Input/Output) device interface 116, and a network interface 118, all of which are communicatively coupled, directly or indirectly, for inter-component communication via a memory bus 106, an I/O bus 108, bus interface unit 109, and an I/O bus interface unit 110.

The computer system 100 may contain one or more general-purpose programmable central processing units (CPUs) 102A and 102B, herein generically referred to as the processor 102. In embodiments, the computer system 100 may contain multiple processors; however, in certain embodiments, the computer system 100 may alternatively be a single CPU system. Each processor 102 executes instructions stored in the memory 104 and may include one or more levels of on-board cache. In embodiments, the computer system 100 may be communicatively connected to a coherent accelerator 199. The coherent accelerator 199 may include a platform for facilitating implementation of software-specific, computation-heavy algorithms on a field-programmable gate array (FPGA).

In embodiments, the memory 104 may include a random-access semiconductor memory, storage device, or storage medium (either volatile or non-volatile) for storing or encoding data and programs. In certain embodiments, the memory 104 represents the entire virtual memory of the computer system 100, and may also include the virtual memory of other computer systems coupled to the computer system 100 or connected via a network. The memory 104 can be conceptually viewed as a single monolithic entity, but in other embodiments the memory 104 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The memory 104 may store all or a portion of the various programs, modules and data structures for processing data transfers as discussed herein. For instance, the memory 104 can store a speculative execution management application 150. In embodiments, the speculative execution management application 150 may include instructions or statements that execute on the processor 102 or instructions or statements that are interpreted by instructions or statements that execute on the processor 102 to carry out the functions as further described below. In certain embodiments, the speculative execution management application 150 is implemented in hardware via semiconductor devices, chips, logical gates, circuits, circuit cards, and/or other physical hardware devices in lieu of, or in addition to, a processor-based system. In embodiments, the speculative execution management application 150 may include data in addition to instructions or statements.

The computer system 100 may include a bus interface unit 109 to handle communications among the processor 102, the memory 104, a display system 124, and the I/O bus interface unit 110. The I/O bus interface unit 110 may be coupled with the I/O bus 108 for transferring data to and from the various I/O units. The I/O bus interface unit 110 communicates with multiple I/O interface units 112, 114, 116, and 118, which are also known as I/O processors (IOPs) or I/O adapters (IOAs), through the I/O bus 108. The display system 124 may include a display controller, a display memory, or both. The display controller may provide video, audio, or both types of data to a display device 126. The display memory may be a dedicated memory for buffering video data. The display system 124 may be coupled with a display device 126, such as a standalone display screen, computer monitor, television, or a tablet or handheld device display. In one embodiment, the display device 126 may include one or more speakers for rendering audio. Alternatively, one or more speakers for rendering audio may be coupled with an I/O interface unit. In alternate embodiments, one or more of the functions provided by the display system 124 may be on board an integrated circuit that also includes the processor 102. In addition, one or more of the functions provided by the bus interface unit 109 may be on board an integrated circuit that also includes the processor 102.

The I/O interface units support communication with a variety of storage and I/O devices. For example, the terminal interface unit 112 supports the attachment of one or more user I/O devices 120, which may include user output devices (such as a video display device, speaker, and/or television set) and user input devices (such as a keyboard, mouse, keypad, touchpad, trackball, buttons, light pen, or other pointing device). A user may manipulate the user input devices using a user interface, in order to provide input data and commands to the user I/O device 120 and the computer system 100, and may receive output data via the user output devices. For example, a user interface may be presented via the user I/O device 120, such as displayed on a display device, played via a speaker, or printed via a printer.

The storage interface 114 supports the attachment of one or more disk drives or direct access storage devices 122 (which are typically rotating magnetic disk drive storage devices, although they could alternatively be other storage devices, including arrays of disk drives configured to appear as a single large storage device to a host computer, or solid-state drives, such as flash memory). In some embodiments, the storage device 122 may be implemented via any type of secondary storage device. The contents of the memory 104, or any portion thereof, may be stored to and retrieved from the storage device 122 as needed. The I/O device interface 116 provides an interface to any of various other I/O devices or devices of other types, such as printers or fax machines. The network interface 118 provides one or more communication paths from the computer system 100 to other digital devices and computer systems; these communication paths may include, e.g., one or more networks 130.

Although the computer system 100 shown in FIG. 1 illustrates a particular bus structure providing a direct communication path among the processors 102, the memory 104, the bus interface 109, the display system 124, and the I/O bus interface unit 110, in alternative embodiments the computer system 100 may include different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 110 and the I/O bus 108 are shown as single respective units, the computer system 100 may, in fact, contain multiple I/O bus interface units 110 and/or multiple I/O buses 108. While multiple I/O interface units are shown, which separate the I/O bus 108 from various communications paths running to the various I/O devices, in other embodiments, some or all of the I/O devices are connected directly to one or more system I/O buses.

In various embodiments, the computer system 100 is a multi-user mainframe computer system, a single-user system, or a server computer or similar device that has little or no direct user interface, but receives requests from other computer systems (clients). In other embodiments, the computer system 100 may be implemented as a desktop computer, portable computer, laptop or notebook computer, tablet computer, pocket computer, telephone, smart phone, or any other suitable type of electronic device.

Figure 2:
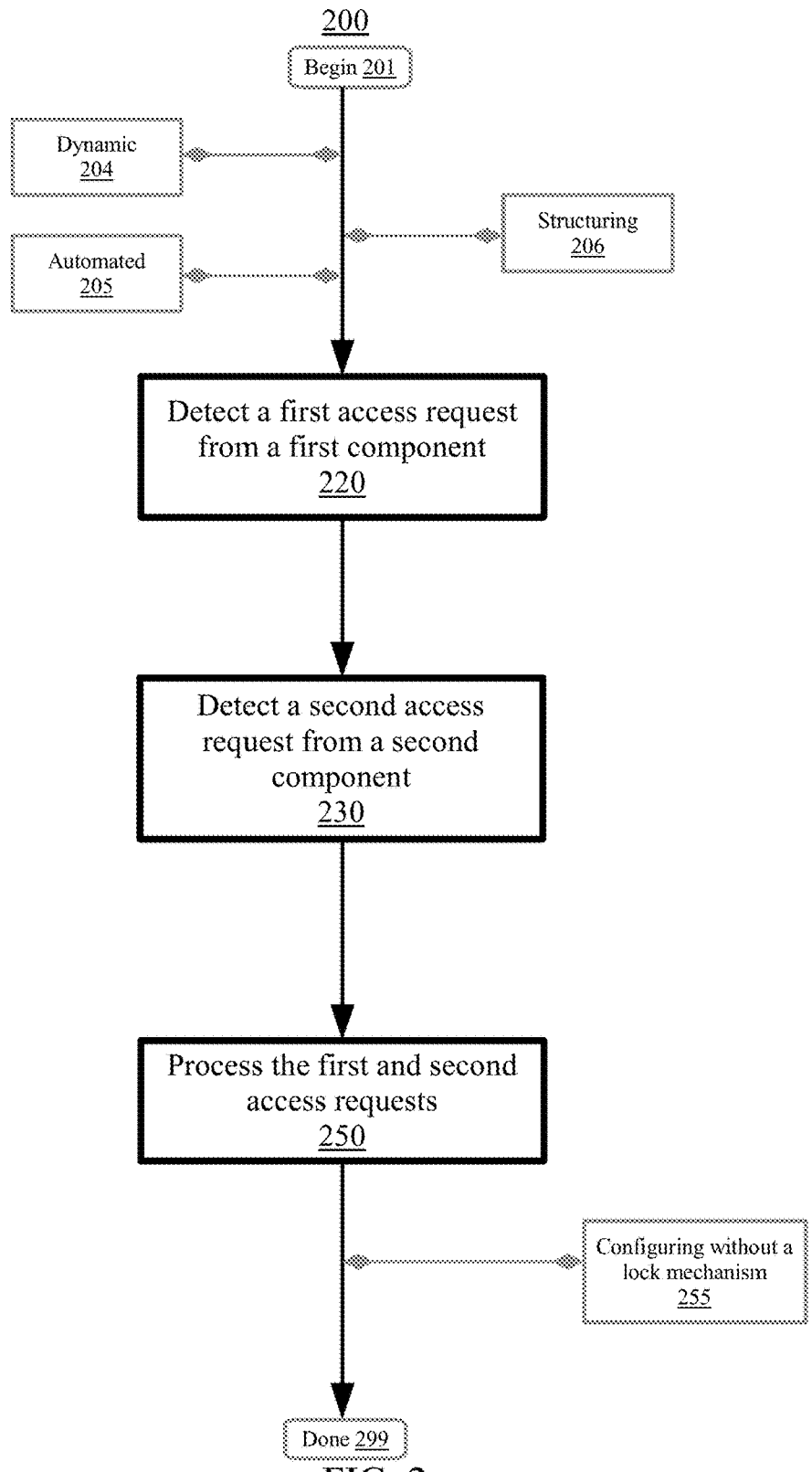
FIG. 2 is a flowchart illustrating a method for speculative execution management in a coherent accelerator architecture, according to embodiments.

FIG. 2 is a flowchart illustrating a method 200 for speculative execution management in a coherent accelerator architecture, according to embodiments. The method 200 may begin at block 201. Aspects of method 200 relate to processing a first and second access request with respect to a set of memory spaces of a single shared memory in the coherent accelerator architecture using a speculative execution technique. Aspects of the disclosure relate to the recognition that, in some situations, the use of "lock" and "unlock" techniques in a coherent accelerator architecture may result in congestion, stalls, or system slowdown as multiple functional units wait for their turn to access the shared cache. Accordingly, aspects of the disclosure relate to utilizing a speculative execution technique to allow multiple functional units to access the shared cache (e.g., at the same time). In the event of a conflict, the state of the shared cache may be rolled-back to a previous state captured by a checkpoint, and the access requests may be retried. In the event that a conflict does not occur, the modified cache lines may be written back to a host memory directory in a batch fashion (e.g., all at once, rather than one at a time). As such, access requests with respect to the shared cache may be performed in a parallel fashion, promoting task performance, shared cache availability, and coherent accelerator resource usage efficiency. The method 200 may begin at block 201.

In embodiments, the detecting the first access request, the detecting the second access request, the processing the first and second access requests, and the other steps described herein may be executed in a dynamic fashion at block 204. The operational steps may be executed in a dynamic fashion to streamline speculative execution management in the coherent accelerator architecture. For instance, the detecting the first access request, the detecting the second access request, the processing the first and second access requests, and the other steps described herein may occur in real-time, ongoing, or on-the-fly. As an example, one or more steps described herein may be performed in an ongoing fashion (e.g., the speculative executive management technique may be used to facilitate continuous access to the set of memory spaces of the single shared memory by multiple components) in order to streamline (e.g., facilitate, promote, enhance) speculative execution management in the coherent accelerator architecture. Other methods of performing the steps described herein are also possible.

In embodiments, the detecting the first access request, the detecting the second access request, the processing the first and second access requests, and the other steps described herein may be executed in an automated fashion at block 205. The operational steps may be executed in an automated fashion without user intervention. In embodiments, the detecting the first access request, the detecting the second access request, the processing the first and second access requests, and the other steps described herein may be carried out by an internal speculative execution management module maintained in a persistent storage device of a locale computing device (e.g., network node). In embodiments, the detecting the first access request, the detecting the second access request, the processing the first and second access requests, and the other steps described herein may be carried out by an external speculative execution management module hosted by a remote computing device or server (e.g., server accessible via a subscription, usage-based, or other service model). In this way, aspects of speculative execution management in a coherent accelerator architecture may be performed using automated computing machinery without manual action. Other methods of performing the steps described herein are also possible.

In embodiments, the set of memory spaces of the single shared memory may be structured at block 206. Generally, structuring can include building, forming, organizing, assembling, creating, constructing, arranging, or otherwise establishing the set of memory spaces of the single shared memory. The single shared memory may include a portion of volatile or non-volatile computer memory that is configured to be accessed by multiple hardware devices (e.g., accelerator function units or central processing units) to facilitate data communication. As examples, the single shared memory may include cache memory, main memory (e.g., block of random access memory), persistent storage (e.g., hard disks, solid state drive), or the like. The single shared memory may include a set of memory spaces. The set of memory spaces may include portions, segments, slots, locations, partitions or other regions of the single shared memory space for maintaining data. For instance, the set of memory spaces may include memory addresses that call out particular regions of the single shared memory. In embodiments, the structuring may be performed in the coherent accelerator architecture to include a set of cache lines in the single shared memory in the coherent accelerator architecture. The set of cache lines may include fixed-size data blocks for maintaining data entries in the set of memory spaces of the single shared memory. As an example, the set of cache lines may include a series of bits that may be read from and written to by hardware devices or software modules that access the set of memory spaces. In embodiments, first and second components may be structured to be selected from the group consisting of one or more Accelerator Functional Units (AFUs) and one or more host processors. The first and second components may include hardware devices (e.g., processors, functional units) or software modules (e.g., programs, applications, task threads) configured to access the set of memory spaces to fulfill access requests with respect to data stored in the set of cache lines (e.g., perform read and write operations). In embodiments, the first and second components may include one or more Accelerator Functional Units (AFUs). The AFUs may include user-defined functions for providing software applications with additional computational unit density for hardware acceleration of application functions to promote application performance. The AFUs may be configured to process data and initiate data transfers to facilitate task execution. In embodiments, the one or more host processors may include central computing units (e.g., central processing units) configured to manage scheduling, resource allocation, and execution of tasks with respect to the coherent accelerator architecture. In embodiments, both the set of AFUs and the one or more host processors may be configured to access the set of cache lines to facilitate resolution of access requests for data of the shared memory space. Other methods of structuring the set of memory spaces and the first and second components are also possible.

At block 220, a first access request from a first component may be detected. The detecting may be performed with respect to a set of memory spaces of a single shared memory in the coherent accelerator architecture. Generally, detecting can include sensing, discovering, recognizing, resolving, identifying, or otherwise ascertaining the first access request from the first component. As described herein, the first component may include an AFU, a host processor, a software application, or the like. The first component may be configured to submit the first access request to the set of memory spaces. The first access request may include a query, appeal, command, directive instruction, or other petition for authorization to access the set of memory spaces of the single shared memory. For instance, the first access request may include a query to read a set of data maintained in a designated cache line of the set of memory spaces. In embodiments, detecting may include receiving the first request with respect to the set of memory spaces of the single shared memory using a cache manager. The cache manager may verify the source of the first access request (e.g., the first component), identify which cache lines of the set of memory spaces are specified by the first access request, and allow or prevent the first component from accessing the set of memory spaces to carry-out the first access request. Consider the following example. A first component including an AFU may submit a first access request to the cache manager requesting access to cache lines 34-41 in order to carry-out an accelerator operation for an application. The cache manager may detect the first access request, validate that the first access request is from an authorized component, and either grant or prevent the first access request with respect to the set of memory spaces (e.g., based on what other components are accessing the set of memory spaces, which memory spaces are being accessed). Other methods of detecting the first access request from the first component with respect to the set of memory spaces of the single shared memory in the coherent accelerator architecture are also possible.

At block 230, a second access request from a second component may be detected. The detecting may be performed with respect to the set of memory spaces of the single shared memory in the coherent accelerator architecture. Generally, detecting can include sensing, discovering, recognizing, resolving, identifying, or otherwise ascertaining the second access request from the second component. As described herein, the second component may include an AFU, a host processor, or the like. In embodiments, the second component may differ from the first component (e.g., be physically separate devices or logically distinct applications). The second component may be configured to submit the second access request to the set of memory spaces. The second access request may include a query, appeal, command, directive instruction, or other petition for authorization to access the set of memory spaces of the single shared memory. For instance, the second access request may include a query to write a set of data to a specified cache line of the set of memory spaces. In embodiments, detecting may include receiving the second request with respect to the set of memory spaces of the single shared memory using a cache manager. The cache manager may verify the source of the second access request (e.g., the second component), identify which cache lines of the set of memory spaces are specified by the second access request, and allow or prevent the second component from accessing the set of memory spaces to carry-out the second access request. Consider the following example. A second component including a host processor may submit a second access request to the cache manager requesting write access to cache lines 18-29 in order to save the results of an accelerator test operation. The cache manager may detect the second access request, validate that the second access request is from an authorized component, and either grant or prevent the second access request with respect to the set of memory spaces (e.g., based on what other components are accessing the set of memory spaces, which memory spaces are being accessed). Other methods of detecting the second access request from the second component with respect to the set of memory spaces of the single shared memory in the coherent accelerator architecture are also possible.

At block 250, the first and second access requests may be processed with respect to the set of memory spaces of the single shared memory in the coherent accelerator architecture. The processing may be performed by a speculative execution management engine using a speculative execution technique. Generally, processing can include analyzing, instantiating, evaluating, executing, implementing, performing, or otherwise managing the first and second access requests with respect to the set of memory spaces of the single shared memory in the coherent accelerator architecture. In embodiments, the first and second access requests may be processed by a speculative execution management engine using a speculative execution technique. The speculative execution management engine may include a component or module configured to apply one or more optimistic concurrency control (OCC) techniques with respect to the coherent accelerator architecture to facilitate transaction performance. The speculative execution technique may include a method for initiating performance of one or more transactions (e.g., the first and second access requests) with respect to the single shared memory based on an assumption that the transactions will complete without incident. For instance, in embodiments, the speculative execution technique may include a method for managing access requests with respect to the single shared memory by allowing multiple components to simultaneously access the set of memory spaces with respect to a speculative execution period (e.g., based on the assumption that a plurality of components will not read or write to the same cache line before the speculative execution submits results, causing a conflict). In embodiments, processing the first and second access requests using the speculative execution technique may include granting both the first and second access requests to allow the first and second components to access the set of memory spaces of the single shared memory. For example, processing may include simultaneously allowing a first component to perform a read operation with respect to cache lines 56-59 and a second component to perform a write operation with respect to cache lines 44-48 of the set of memory spaces (e.g., with respect to the same speculative execution period). Other methods of processing the first and second access requests with respect to the set of memory spaces of the single shared memory in the coherent accelerator architecture are also possible.

In embodiments, the speculative execution technique may be configured at block 255. The configuring may be performed without a lock mechanism when processing the first and second access requests with respect to the set of memory spaces of the single shared memory in the coherent accelerator architecture. Generally, configuring can include formulating, arranging, instructing, setting-up, computing, or otherwise structuring the speculative execution technique to be performed without a lock mechanism. The lock mechanism may include a technique for blocking or preventing access to all or a portion of the single shared memory when the set of memory spaces are in use by another component (e.g., AFU performing a read or write application to a cache line). In embodiments, aspects of the disclosure relate to the recognition that use of a lock mechanism may inhibit transaction concurrency in the coherent accelerator architecture, as only one component is allowed to access the set of memory spaces at a time (e.g., such that other components must wait their turn before resolving access requests). Accordingly, aspects of the disclosure relate to configuring the speculative execution technique without a lock mechanism. In embodiments, configuring the speculative execution technique may include disabling the lock mechanism with respect to the single shared memory, such that a plurality of components may be allowed to access the set of memory spaces of the single shared memory in a parallel fashion for access request performance. Other methods of configuring the speculative execution technique without the lock mechanism are also possible.

Consider the following example. A coherent accelerator architecture may include a single shared memory including a cache. The cache may have a set of memory spaces including a plurality of cache lines for temporary storage of data. The coherent accelerator architecture may include a cache manager configured to control access to the cache. In embodiments, the cache manager may detect a first access request from a first AFU (e.g., first component). The first request may indicate a write operation with respect to cache lines 4-13 of a set of pending data that has been modified by a process and has not yet been saved to main memory. In embodiments, the cache manager may detect a second access request from a second AFU (e.g., second component). The second request may indicate a read operation with respect to cache lines 55-62 to fetch a set of instructions for implementing an accelerator function for an application. As described herein, aspects of the disclosure relate to processing the first and second requests with respect to the set of memory spaces using a speculative execution technique. The speculative execution technique may be configured to allow both the first and second components to simultaneously access the plurality of cache lines to resolve the first and second access requests, respectively (e.g., rather than locking the cache and restricting cache line access to one component at a time). As such, transaction concurrency may be facilitated to promote efficient usage of coherent accelerator system resources and the coherent bus in the coherent accelerator architecture.

Method 200 concludes at block 299. Aspects of method 200 may provide performance or efficiency benefits related to speculative execution management. For instance, allowing multiple components to access the set of memory spaces of the single shared memory may allow for access requests to be handled in a parallel fashion, saving the time of access requests waiting in queues for their turn to be processed. Altogether, leveraging the speculative execution technique with respect to a coherent accelerator architecture context may be associated with benefits for cache availability, access request performance, and coherent accelerator resource usage efficiency. Aspects may save resources such as bandwidth, disk, processing, or memory.

Figure 3:
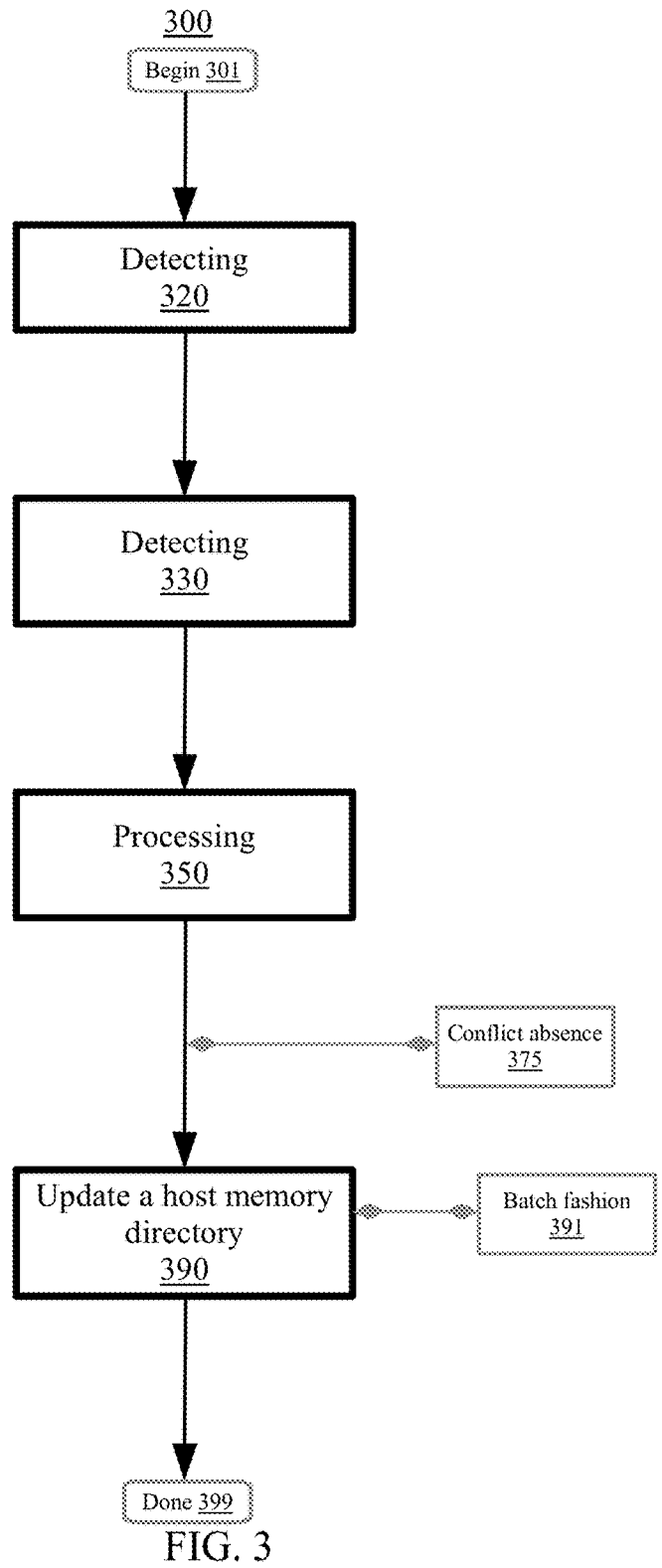
FIG. 3 is a flowchart illustrating a method for speculative execution management in a coherent accelerator architecture, according to embodiments.

FIG. 3 is a flowchart illustrating a method 300 for speculative execution management in a coherent accelerator architecture, according to embodiments. Aspects of method 300 relate to determining a conflict absence based on the first and second access requests with respect to the set of memory spaces of the single shared memory in the coherent accelerator architecture, and updating a host memory directory in response to determining the conflict absence. Aspects of method 300 may be similar or the same as aspects of method 200, and aspects may be utilized interchangeably. The method 300 may begin at block 301. At block 320, a first access request from a first component may be detected. The detecting may be performed with respect to a set of memory spaces of a single shared memory in the coherent accelerator architecture. At block 330, a second access request from a second component may be detected. The detecting may be performed with respect to the set of memory spaces of the single shared memory in the coherent accelerator architecture. At block 350, the first and second access requests may be processed with respect to the set of memory spaces of the single shared memory in the coherent accelerator architecture. The processing may be performed by a speculative execution management engine using a speculative execution technique.

In embodiments, the first and second access requests may be evaluated at block 375. The evaluating may be performed with respect to the set of memory spaces of the single shared memory in the coherent accelerator architecture. Generally, evaluating can include analyzing, assessing, appraising, investigating, or otherwise examining the first and second access requests with respect to the set of memory spaces. In embodiments, evaluating may include analyzing the first and second access requests to identify a first subset of target memory spaces for the first access request and a second subset of target memory spaces for the second access request. The first and second subsets of target memory spaces may indicate the cache lines that are designated by each access request as the target of read or write operations. In embodiments, evaluating may include comparing a first set of read and write bits of the first subset of target memory spaces with a second subset of read and write operation requests of the second subset of target memory spaces to ascertain whether a write access request is performed with respect to a cache line which has already been read by another component (e.g., a read-write conflict), a write access request is performed with respect to a cache line which has already been written by another component (e.g., a write-write conflict), or a read access request is performed with respect to a cache line which has already been written by another component (e.g., a write-read conflict. As an example, a first set of read and write bits of a first subset of target memory spaces of "Cache lines 15-25" may be compared with a second set of read and write bits of a second subset of target memory spaces of "Cache lines 31-39." Other methods of evaluating the first and second access requests are also possible.

In embodiments, a conflict absence may be determined. The determining may be performed based on the first and second access requests with respect to the set of memory spaces of the single shared memory in the coherent accelerator architecture. Generally, determining can include formulating, resolving, computing, calculating, identifying, or otherwise ascertaining the conflict absence based on the first and second access requests. The conflict absence may include an indication that both the first access request and the second access request may be carried-out without interruption (e.g., multiple components are not trying to edit the same set of memory spaces). The conflict absence may indicate that no type of conflict (e.g., read-write conflict, write-write conflict, write-read conflict) occurred/will occur with respect to the set of memory spaces. In embodiments, determining may include ascertaining that the first subset of target memory spaces for the first access request do not match the second subset of target memory spaces for the second request (e.g., no overlap, the first and second subsets of target memory spaces are mutually exclusive, no cache line is edited by both the first and second access requests). As an example, consider that a first component requests to read a set of data stored in cache line 40. After completion of the read request, the read bit of cache line 40 may be set to "1." Subsequently, a second component may request to write data to cache line 41. In response to the access request, a cache manager may ascertain that the read bit of cache line 41 is "0," the write bit of cache line 41 is "0," and the new access request is a write request (e.g., such that the second component is not reading or writing to a cache line that has been read or written by the first component.) Accordingly, a conflict absence may be determined with respect to the first and second access requests. In certain embodiments, determining the conflict absence may be based on read and write bits that record read and write behaviors for a cache line. For instance, read and write bits for each cache line of the shared memory may be examined to verify that no cache line is scheduled for modification by a second component that has already been read or written by a first component (e.g., before saving the cache to main memory). Other methods of determining the conflict absence are also possible.

At block 390, a host memory directory may be updated. The updating may be performed in response to processing the first and second access requests with respect to the set of memory spaces of the single shared memory in the coherent accelerator architecture. Generally, updating can include renewing, refreshing, bringing up-to-date, amending, modifying, altering, or otherwise revising the host memory directory. The host memory directory may include a central memory resource configured to maintain records used by the coherent accelerator architecture. For instance, the host memory directory may include a main (e.g., primary) memory unit for the coherent accelerator architecture. In embodiments, updating the host memory directory may include transferring data from the single shared memory to the host memory directory. For instance, in certain embodiments, updating may include writing (e.g., copying) the cache lines that were modified by the first and second access requests to the host memory directory to facilitate availability to other applications, components, and programs of the coherent accelerator architecture. As an example, consider that cache lines 15-25 were edited by the first access request and that cache lines 31-39 were modified by the second access request. Accordingly, updating may include copying the data from cache lines 15-25 and 31-39 from the single shared memory to the host memory directory. Other methods of updating the host memory directory in response to processing the first and second access requests with respect to the set of memory spaces of the single shared memory in the coherent accelerator architecture are also possible.

In embodiments, the host memory directory may be updated at block 391. The updating may be performed in a batch fashion. The batch fashion may includes a set of update data for both the first and second access requests in a single set of data traffic. Generally, updating can include renewing, refreshing, bringing up-to-date, amending, modifying, altering, or otherwise revising the host memory directory in a batch fashion. Batch fashion may refer to a technique for transferring (e.g., copying) a plurality (e.g., series) of data entries from the single shared memory to the host memory directory in a batch, bundle, or group (e.g., as opposed to one-by-one). In embodiments, updating the host memory directory in batch fashion may include identifying a first set of cache lines that have been modified by the first access request, identifying a second set of cache lines that have been modified by the second access request, aggregating a set of data entries from both the first and second sets of cache lines, and transmitting the data entries to the host memory directory as a single set of data traffic utilizing a coherent bus that facilitates communication between the single shared memory and the host memory directory. The single set of data traffic may include a batch or bundle of data (e.g., data records from the cache) that is formatted as a single digital package. As an example, consider that cache lines 14-22 were edited by the first access request and cache lines 28-33 were edited by the second access request. Updating in batch fashion may include aggregating data entries from both cache lines 14-22 as well as cache lines 28-33, and copying the data entries from both sets of cache lines to the host memory directory at once as a single set of data traffic. Other methods of updating the host memory directory in batch fashion are also possible.

Method 300 concludes at block 399. Aspects of method 300 may provide performance or efficiency benefits related to speculative execution management. Altogether, leveraging the speculative execution technique with respect to a coherent accelerator architecture context may be associated with benefits for cache availability, access request performance, and coherent accelerator resource usage efficiency. Aspects may save resources such as bandwidth, disk, processing, or memory.

Figure 4:
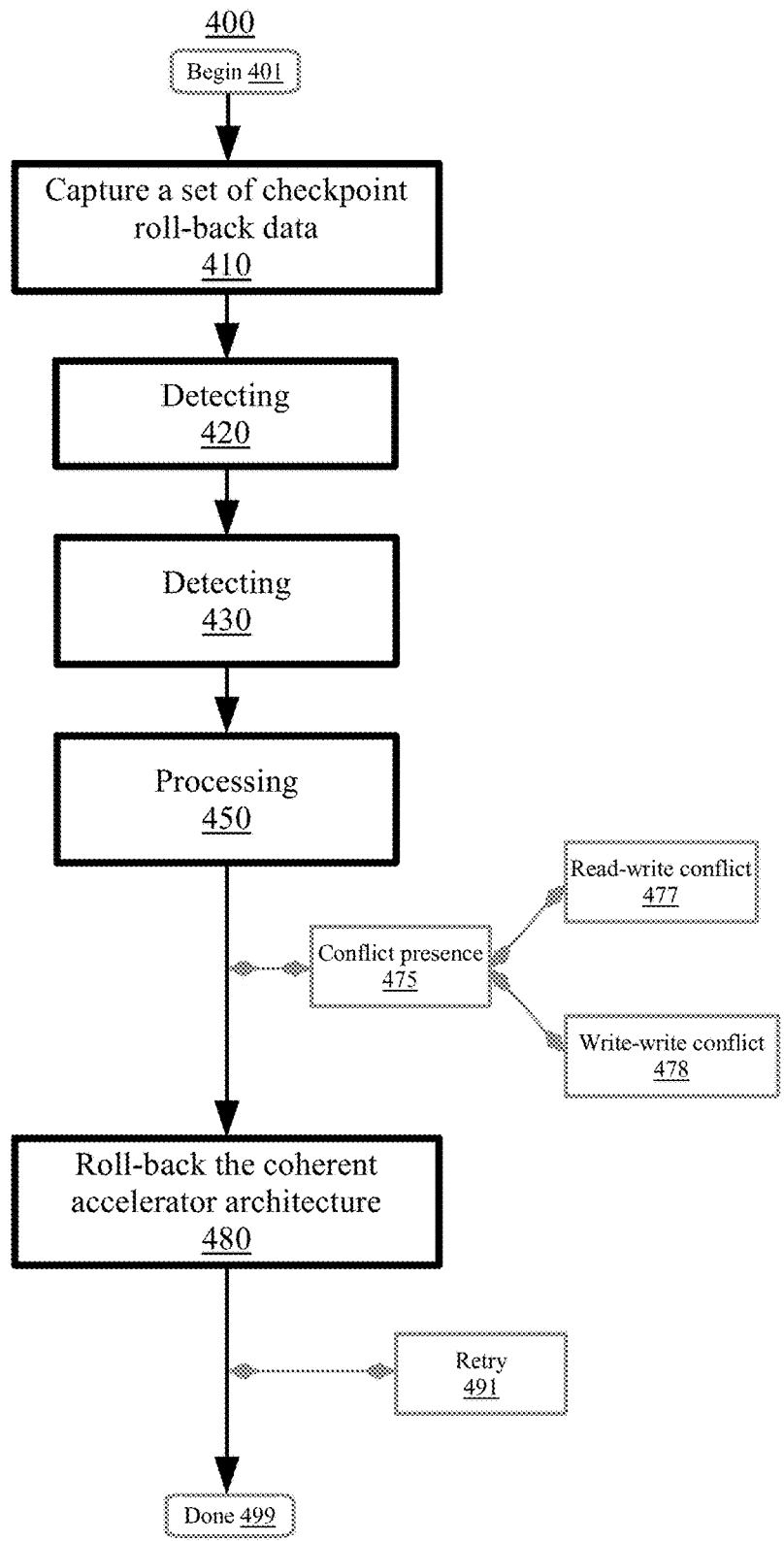
FIG. 4 is a flowchart illustrating a method for speculative execution management in a coherent accelerator architecture, according to embodiments.

FIG. 4 is a flowchart illustrating a method 400 for speculative execution management in a coherent accelerator architecture, according to embodiments. Aspects of method 400 relate to determining a conflict presence based on the first and second access requests with respect to the set of memory spaces of the single shared memory in the coherent accelerator architecture, and rolling-back the coherent accelerator architecture to a prior state. Aspects of method 400 may be similar or the same as aspects of method 200/300, and aspects may be utilized interchangeably. The method 400 may begin at block 401.

At block 410, a set of checkpoint roll-back data may be captured. The capturing may be performed by the speculative execution management engine. Generally, capturing can include recording, saving, logging, retaining, storing, maintaining, or otherwise preserving the set of checkpoint roll-back data. The set of checkpoint roll-back data may include a collection of information that characterizes the state of a set of components (e.g., accelerator function units) at a particular point in time. For instance, the set of checkpoint roll-back data may indicate a set of values indicated by control registers of one or more accelerator function units and work elements that define the state of the accelerator function unit at a given point in time. In embodiments, capturing the set of checkpoint roll-back data may include recording an image (e.g., snapshot) of a function unit for a work elements descriptor at a first point in time, and storing the image (e.g., in a cache manager, in the single shared memory, in the host memory directory) together with a timestamp of the time it was taken (e.g., September 16th, 4:13 PM). In certain embodiments, the set of checkpoint roll-back data may be captured in response to a triggering event. For instance, capturing may be initiated in response to detection of an access request with respect to the single shared memory unit, a threshold number of data entries in the set of memory spaces (e.g., 50), an elapsed time period since a previous capture (e.g., 2 minutes), or the like. In embodiments, the set of checkpoint roll-back data may be used to revert (e.g., roll-back) the single shared memory unit and one or more components to the state indicated by the set of checkpoint roll-back data (e.g., in response to detection of a conflict presence). Other methods of capturing the set of checkpoint roll-back data are also possible.

At block 420, a first access request from a first component may be detected. The detecting may be performed with respect to a set of memory spaces of a single shared memory in the coherent accelerator architecture. At block 430, a second access request from a second component may be detected. The detecting may be performed with respect to the set of memory spaces of the single shared memory in the coherent accelerator architecture. At block 450, the first and second access requests may be processed with respect to the set of memory spaces of the single shared memory in the coherent accelerator architecture. The processing may be performed by a speculative execution management engine using a speculative execution technique.

In embodiments, the first and second access requests may be evaluated at block 475. The evaluating may be performed with respect to the set of memory spaces of the single shared memory in the coherent accelerator architecture. Generally, evaluating can include analyzing, assessing, appraising, investigating, or otherwise examining the first and second access requests with respect to the set of memory spaces. In embodiments, evaluating may include analyzing the first and second access requests to identify a first subset of target memory spaces for the first access request and a second subset of target memory spaces for the second access request. The first and second subsets of target memory spaces may indicate the cache lines that are designated by each access request as the target of read or write operations. In embodiments, evaluating may include comparing a first set of read and write bits of the first subset of target memory spaces with a second subset of read and write operation requests of the second subset of target memory spaces to ascertain whether a write access request is performed with respect to a cache line which has already been read by another component (e.g., a read-write conflict), a write access request is performed with respect to a cache line which has already been written by another component (e.g., a write-write conflict), or a read access request is performed with respect to a cache line which has already been written by another component (e.g., a write-read conflict. As an example, a first subset of target memory spaces of "Cache lines 29-40" may be compared with a second subset of target memory spaces of "Cache lines 23-30." Other methods of evaluating the first and second access requests are also possible.

In embodiments, a conflict presence may be determined. The determining may be performed based on the first and second access requests with respect to the set of memory spaces of the single shared memory in the coherent accelerator architecture. Generally, determining can include formulating, resolving, computing, calculating, identifying, or otherwise ascertaining the conflict presence based on the first and second access requests. The conflict presence may include an indication that the first or second access request encountered an incident or interruption that prevents completion of the access request (e.g., multiple components are attempting to edit the same set of memory spaces). The conflict presence may indicate that one or more types of errors (e.g., read-write conflict, write-write conflict, write-read conflict) occurred/will occur with respect to the set of memory spaces. In embodiments, determining may include ascertaining that one or more of the memory spaces of the first subset of target memory spaces for the first access request matches one or more memory spaces of the second subset of target memory spaces for the second access request (e.g., there is overlap between the first and second access requests, one or more cache lines are edited by both the first and second access requests). For instance, with reference to the previous example in which the first access request indicates a first subset of target memory spaces of "Cache lines 29-40" and the second access request indicates a second subset of target memory spaces of "Cache lines 23-30," it may be ascertained that cache lines 29 and 30 are targeted by both the first and second access requests. As an example, in response to receiving a first write request, write bits for cache lines 29-40 may be set to a value of "1" as the result of the write request. Subsequently, in response to receiving a second write request, a cache manager may read the write bits for cache lines 29-40 and determine that the value of the write bits is already set to "1," such that performance of the second write request would result in a write-write conflict (e.g., unsaved data in the cache would be overwritten). Accordingly, a conflict presence may be determined with respect to the first and second access requests. In certain embodiments, determining the conflict presence may be based on read and write bits that record read and write behaviors for a cache line. For instance, read and write bits for each cache line of the shared memory may be examined to ascertain that the cache line has been modified or attempted to be modified by two or more access requests. Other methods of determining the conflict presence are also possible.

The coherent accelerator architecture may be rolled-back to the prior state. The rolling-back may be performed in response to determining the conflict presence. Generally, rolling-back can include reverting, modifying, converting, revising, recurring, or otherwise returning the coherent accelerator architecture to the prior state. The prior state may include a configuration of the coherent accelerator architecture at an earlier point in time. In embodiments, rolling-back may include reverting the content (e.g., data values, data entries) of the set of memory spaces of the single shared memory to the configuration at the prior state. As an example, consider a situation in which cache lines 2-6 of the set of memory spaces had a value of "0" at an initial time. The first and second access requests may be processed with respect to the set of memory spaces, and cache lines 2-4 and 6 may be modified to a value of "1," and a conflict presence may be detected with respect to cache line 5. In certain embodiments, rolling-back may include returning cache lines 2-6 to the value of "0," as they were at the initial time (e.g., rolling-back all cache lines in response to detecting the conflict presence). In certain embodiments, rolling-back may include retaining cache lines 2-4 and 6 at the value of "1," and returning cache line 5 (e.g., the cache line associated with the conflict presence) to the initial time value of "0" (e.g., only rolling back the cache line or lines associated with the conflict presence). In certain embodiments, rolling back may include identifying those cache lines that have a write-bit with a value of "1," (e.g., indicating that cache line has been written as part of the speculative execution process), and regressing the identified cache lines to the prior state (e.g., a write-bit value of 0). Other methods of rolling back the coherent accelerator architecture to the prior state are also possible.

In embodiments, it may be ascertained that the conflict presence indicates a read-write conflict at block 477. Generally, ascertaining can include detecting, resolving, sensing, recognizing, discovering, identifying, or otherwise determining that the conflict presence indicates the read-write conflict. The read-write conflict may include a type of conflict that occurs when a write operation is executed with respect to a cache line which has already been read by another component (e.g., within the process of speculative execution). In the event of a read-write conflict, the intended sequence of operations may be unclear, such that it may be ambiguous whether the read operation or the write operation was intended to be performed first (e.g., leading to cache misses, impacts to data integrity). In embodiments, ascertaining that the conflict presence indicates the read-write conflict may include detecting that a first access request indicates a read operation with respect to a particular cache line at a particular time, and that a second access request indicates a write operation with respect to the same particular cache line at the same particular time. As an example, consider a first cache line that has a value of "1." A first access request may attempt to perform a read operation of the first cache line at substantially the same time that a second access request attempts to perform a write operation to change the value of the first cache line from "1" to "0." Accordingly, a read-write conflict may be detected with respect to the first cache line. In certain embodiments, the conflict presence may include a write-read conflict (e.g., such that the second access request attempts to perform the write operation and the first access request attempts to perform the read operation with respect to the same cache line at substantially the same time). Other methods of ascertaining that the conflict presence includes the read-write conflict (e.g., or the write-read conflict) are also possible.

In embodiments, it may be ascertained that the conflict presence indicates a write-write conflict at block 478. Generally, ascertaining can include detecting, resolving, sensing, recognizing, discovering, identifying, or otherwise determining that the conflict presence indicates the write-write conflict. The write-write conflict may include a type of conflict that occurs when a write operation is executed with respect to a cache line which has already been written by another component within a speculative execution period (e.g., the period between checkpoint recording and the submission of speculative execution results). In the event of a write-write conflict, the intended sequence of operations may be unclear, such that it may be ambiguous which write operation was intended to be performed first (e.g., leading to cache misses, impacts to data integrity). In embodiments, ascertaining that the conflict presence indicates the write-write conflict may include detecting that a first access request indicates a first write operation with respect to a particular cache line at a particular time, and that a second access request indicates a write operation with respect to the same particular cache line at the same particular time. As an example, consider a first cache line that has a value of "0." A first access request may attempt to perform a first write operation to write a value of "0" to the first cache line at substantially the same time that a second access request attempts to perform a second write operation to write a value of "1" to the first cache line. Accordingly, a write-write conflict may be detected with respect to the first cache line (e.g., it may be unclear what the final intended value of the first cache line should be). Other methods of ascertaining that the conflict presence includes the write-write conflict are also possible.

At block 480, the coherent accelerator architecture may be rolled-back to a prior state. The rolling-back may be performed based on the set of checkpoint roll-back data. Generally, rolling-back can include reverting, modifying, converting, revising, recurring, or otherwise returning the coherent accelerator architecture to the prior state based on the set of checkpoint roll-back data. As described herein, the prior state may include a configuration of the coherent accelerator architecture at an earlier point in time. In embodiments, rolling-back may include reverting the content (e.g., data values, data entries) of the set of memory spaces of the single shared memory to the configuration at the prior state as indicated by the set of checkpoint roll-back data. For instance, rolling-back may include loading the set of checkpoint roll-back data from memory (e.g., cache memory, cache manager storage, main memory), and returning one or more components (e.g., accelerator function units, work elements) to the same state (e.g., same data entries/records) as when the set of checkpoint roll-back data was captured. In certain embodiments, rolling-back may include invalidating modified cache lines which have been written to during the speculative execution process, and resetting all the write bits and read bits of the modified cache lines. In embodiments, rolling-back may be performed in response to initiating processing of the first and second access requests, or during processing of the first and second access requests. In certain embodiments, rolling-back may be performed in response to a trigger event. For instance, the trigger event may include detecting a conflict presence (e.g., read-write conflict, write-read conflict, write-write conflict) with respect to the set of memory spaces, ascertaining that the conflict presence achieves a severity threshold (e.g., number of cache lines affected is greater than a tolerance level; 5 cache lines), or the like. Consider the following example. A set of checkpoint roll-back data may indicate that cache lines 33-42 had a value of "1" at an initial time. The first and second access requests may be processed with respect to the set of memory spaces, and cache lines 31-39 and 42 may be modified to a value of "0," and a conflict presence may be detected with respect to cache line 41. As described herein, rolling-back may include examining the set of checkpoint roll-back data, and converting cache lines 33-42 to a value of "O" as at the initial time. In certain embodiments, rolling back may include rolling back only those cache lines associated with the conflict presence (e.g., cache line 41). Other methods of rolling-back the coherent accelerator architecture to a prior state based on the checkpoint roll-back data are also possible.

In embodiments, the first and second access requests may be retried at block 491. The retrying may be performed without using the speculative execution technique. The retrying may include performed in the first and second access requests in a separate fashion in relation to one another. The retrying may be performed with respect to the set of memory spaces of the single shared memory in the coherent accelerator architecture. Generally, retrying can include redoing, attempting, performing, executing, or otherwise repeating the first and second access requests in a separate fashion with respect to the set of memory spaces. Retrying the first and second access requests in a separate fashion may include processing the first and second access requests independently, in isolation, or at staggered times with respect to one another. For instance, retrying the first and second access requests in a separate fashion may include using the cache manager to schedule the first access request for execution during a first time window (e.g., time duration, 2:10-2:12 PM), and scheduling the second access request for execution during a second time window (e.g., 2:13-2:15 PM). In embodiments, retrying may include performing the first and second access requests without using the speculative execution technique. For instance, in certain embodiments, retrying may include repeating the first and second access requests using the speculative execution technique until it is detected that a retry count for the first and second access requests achieves a repetition threshold (e.g., 5 times, 10 times), and subsequently disabling the speculative execution technique and once again initiating processing of the first and second access requests. In embodiments, retrying the first and second access requests may be performed in response to detecting the conflict presence with respect to the set of memory spaces. Other methods of retrying the first and second access requests without using the speculative execution technique and in a separate fashion in relation to one another are also possible.

Method 400 concludes at block 499. Aspects of method 400 may provide performance or efficiency benefits related to speculative execution management. Altogether, leveraging the speculative execution technique with respect to a coherent accelerator architecture context may be associated with benefits for cache availability, access request performance, and coherent accelerator resource usage efficiency. Aspects may save resources such as bandwidth, disk, processing, or memory.

Figure 5:
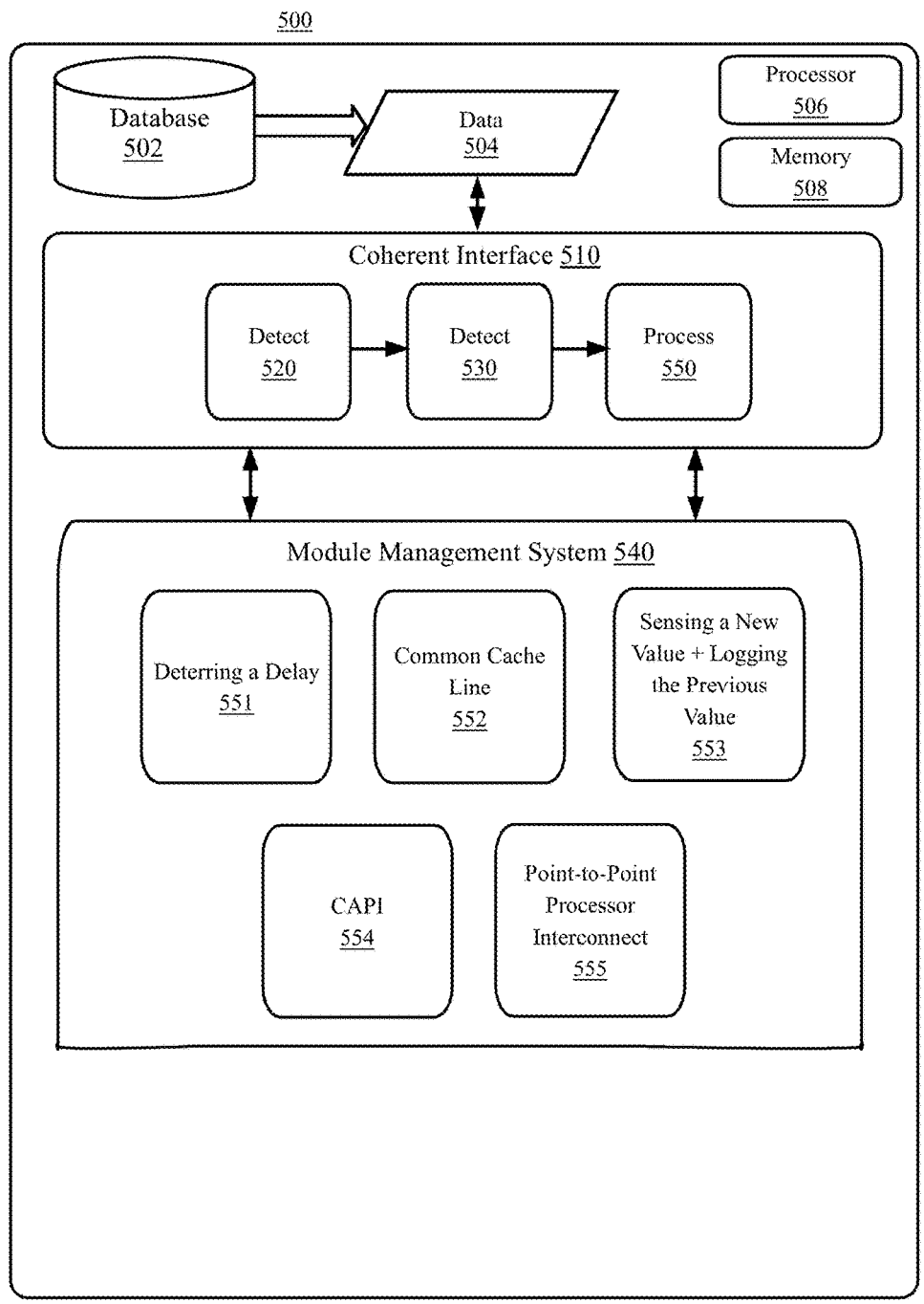
FIG. 5 depicts an example system for speculative execution management in a coherent accelerator architecture, according to embodiments.

FIG. 5 depicts an example system 500 for speculative execution management in a coherent accelerator architecture, according to embodiments. The example system 500 may include a processor 506 and a memory 508 to facilitate implementation of speculative execution management. The example system 500 may include a database 502 configured to maintain data used for speculative execution management. In embodiments, the example system 500 may include a coherent interface 510. The coherent interface 510 may be communicatively connected to the database 502, and be configured to receive data 504 related to speculative execution management. The coherent interface 510 may include a detecting module 520 to detect a first access request, a detecting module 530 to detect a second access request, and a processing module 550 to process the first and second access requests. The coherent interface 510 may be communicatively connected with a module management system 540 that includes a set of modules for implementing aspects of speculative execution management.

In embodiments, a delay to utilize the set of memory spaces of the single shared memory in the coherent accelerator architecture may be deterred at module 551. The deterring may be performed to streamline the first and second access requests from the first and second components. Aspects of the disclosure relate to the recognition that, in some situations, access requests with respect to the set of memory spaces may be delayed, resulting in slow-down as components wait their turn to process access requests. Accordingly, aspects of the disclosure relate to deterring the delay to promote streamlined processing of the first and second access requests. Generally, deterring can include limiting, restricting, avoiding, inhibiting, or otherwise mitigating the delay to utilize the set of memory spaces of the single shared memory in the coherent accelerator architecture. In embodiments, deterring the delay may include selecting a first subset of access requests below a threshold number (e.g., four access requests), and simultaneously initiating performance of the subset of access requests with respect to the set of memory spaces (e.g., such that the access requests may be processed without delay). In embodiments, deterring the delay may include assigning a priority indicator (e.g., integer between 0 and 100) to a set of access requests based on the type of the access request (e.g., read or write), the number of memory spaces targeted by the access request (e.g., 2 cache lines, 10 cache lines), the component from which the access request was received (e.g., the first component, the second component), or other characteristics, and subsequently expediting performance of a subset of the set of access requests that achieve a priority threshold (e.g., priority indicator of 75 or greater). Other methods of deterring the delay to utilize the set of memory spaces of the single shared memory in the coherent accelerator architecture are also possible.

In embodiments, the first and second access requests may be processed with respect to a common cache line of the set of memory spaces of the single shared memory in the coherent accelerator architecture at module 552. The processing may be performed by the speculative execution management engine using the speculative execution technique. Generally, processing can include analyzing, instantiating, evaluating, executing, implementing, performing, or otherwise managing the first and second access requests with respect to the common cache line of the set of memory spaces. The common cache line may include one or more cache lines that are mutually accessible for processing of the first and second access requests. As described herein, the common cache line may be monitored to detect and manage conflicts (e.g., that occur when multiple components attempt to edit the common cache line at substantially the same time). In embodiments, processing the first and second access requests with respect to a common cache line may include allowing multiple components (e.g., AFUs, host processors) to access the same cache line with speculative execution mode. In certain embodiments, multiple components may be allowed to access the common cache line in a simultaneous fashion. As an example, a first read operation request from a first component and a second read operation request from a second component may processed with respect to the common cache line at substantially the same time. As such, parallel transaction execution may be facilitated in the coherent accelerator architecture. Other methods of processing the first and second access requests with respect to a common cache line of the set of memory spaces of the single shared memory in the coherent accelerator architecture are also possible.

In embodiments, sensing and logging may be performed at module 553. A new value in the common cache line may be sensed. The new value may be sensed to replace a previous value in the common cache line. The sensing may be performed by the speculative execution management engine. Generally, sensing can include detecting, discovering, recognizing, resolving, ascertaining, or otherwise identifying the new value to replace the previous value in the common cache line. The new value may include an integer, bit, character string, or other data element that is added to the common cache line of the single shared memory. The new value may represent an update, revision, addition, or other modification to a previous value (e.g., original, prior data element) of the common cache line. In embodiments, sensing the new value may include using the cache manager to ascertain that a write operation has been performed with respect to the common cache line to replace a previous value of "0" with a new value of "1." In embodiments, the previous value may be logged. The logging may be performed to host memory to facilitate a potential roll-back operation. Generally, logging can include recording, saving, capturing, retaining, storing, maintaining, or otherwise preserving the previous value to facilitate the potential roll-back operation. In embodiments, logging may include performing a write operation of the previous value to the host memory directory. In certain embodiments, logging of the previous value in the host memory directory may be performed in response to detecting a write operation with respect to the common cache line. For instance, in response to detecting a write operation to replace the previous value with the new value, an undo log entry may be performed to record the previous value to system memory (e.g., the host memory directory). In certain situations, the cache manager may determine that the cache line is exclusive (e.g., exclusively used by one or more components), and subsequently transfer the previous value to the host memory (e.g., so that other system components may access the previous value). As described herein, the previous value may be used as part of a roll-back operation to return the single shared memory to a prior state. Other methods of sensing the new value in the common cache line to replace the previous value and logging the previous value to facilitate a potential roll-back operation are also possible.

In embodiments, the coherent accelerator architecture may be structured to include a Coherent Accelerator Processor Interface (CAPI) at module 554. Generally, structuring can include building, forming, organizing, assembling, creating, constructing, arranging, or otherwise establishing the coherent accelerator architecture to include the CAPI. The CAPI architecture may include a platform for facilitating implementation of software-specific, computation-heavy algorithms on a field-programmable gate array (FPGA). The CAPI architecture may be configured to connect a custom acceleration engine to a general, multi-purpose processing architecture (e.g., central processing unit). In embodiments, CAPI may be implemented as an AFU located inside a CPU of a host computing system with a corresponding unit on the accelerator called the Power Service Layer (PSL). The CPU and PSL units may operate as a cache directory such that attached devices and the CPU may share the same coherent memory space. As such, since the CPU and the AFU share the same memory space, low-latency, high-speed communication may be facilitated for accelerator function operations (e.g., as the CPU does not need to perform memory translations/memory shuffling between the main memory of the CPU and the memory spaces of the accelerator). Other methods of structuring the coherent accelerator architecture to include the CAPI architecture are also possible.

In embodiments, the coherent accelerator architecture may be structured to include a point-to-point processor interconnect at module 555. Generally, structuring can include building, forming, organizing, assembling, creating, constructing, arranging, or otherwise establishing the coherent accelerator architecture to include the point-to-point interconnect. The point-to-point processor interconnect may include an infrastructure to provide high-speed, point-to-point links inside and outside of a processor. The point-to-point links may be used to facilitate data transfer by connecting distributed shared memory, internal cores, input/output hubs, and other processors. In embodiments, structuring the coherent accelerator architecture may include using a single point-to-point processor interconnect to connect a processor unit to an input output hub. In certain embodiments, structuring the coherent accelerator architecture may include using a plurality of separate point-to-point processor interconnect pairs to connect one or more processors and one or more input/output hubs (e.g., routing hubs) in a network on the motherboard, allowing each component to access other components via the network on the motherboard. Other methods of structuring the coherent accelerator architecture to include the point-to-point processor interconnect are also possible.

Figure 6:
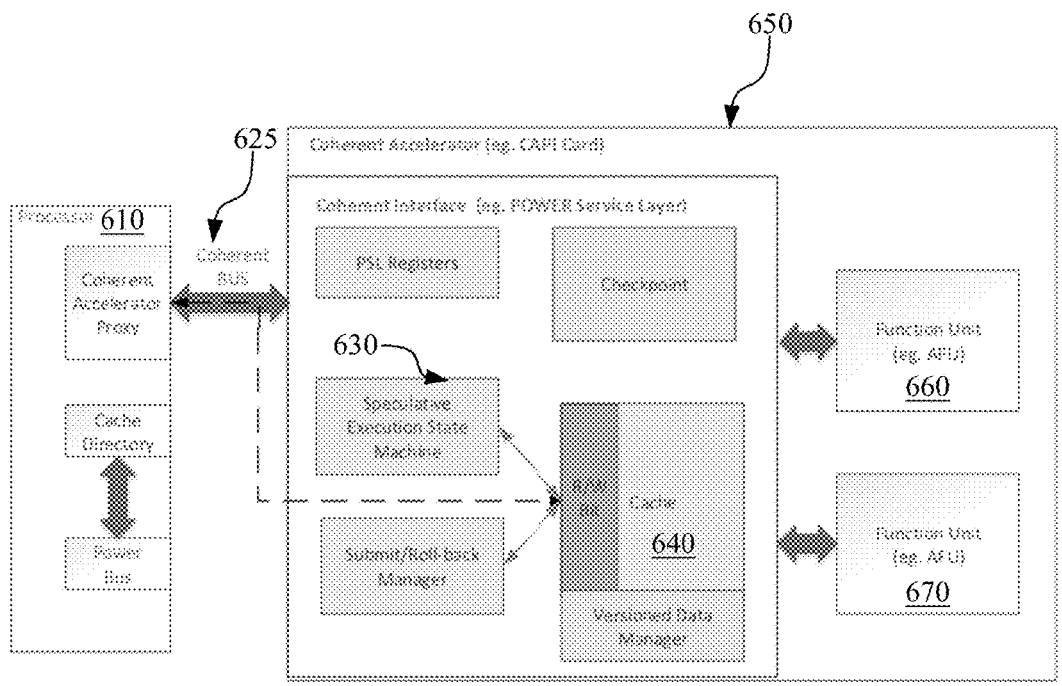
FIG. 6 illustrates an example system infrastructure for speculative execution management in a coherent accelerator architecture, according to embodiments.

FIG. 6 illustrates an example system infrastructure 600 for speculative execution management in a coherent accelerator architecture, according to embodiments. The system infrastructure 600 may include a processor 610 connected to a coherent accelerator interface 650 using a coherent bus 625. The coherent accelerator interface 650 may be communicatively connected to one or more function units. For instance, as shown in FIG. 6, coherent accelerator interface 650 may be connected to a first function unit 660 and a second function unit 670. A speculative execution state machine 630 may be used to allow both the first function unit 660 and the second function unit 670 to access a cache 640 of the coherent accelerator interface 650. As described herein, the speculative execution state machine 630 may be configured to allow both the first function unit 660 and the second function unit 670 to process access requests (e.g., read and write operations) with respect to a common cache line of the cache 640. As such, transaction concurrency may be facilitated with respect to the coherent accelerator infrastructure, promoting efficient utilization of coherent accelerator resources and saving coherent bus path overhead (e.g., as transactions may be performed in parallel fashion). Other types of system infrastructure for speculative execution management in a coherent accelerator architecture are also possible.

Figure 7:
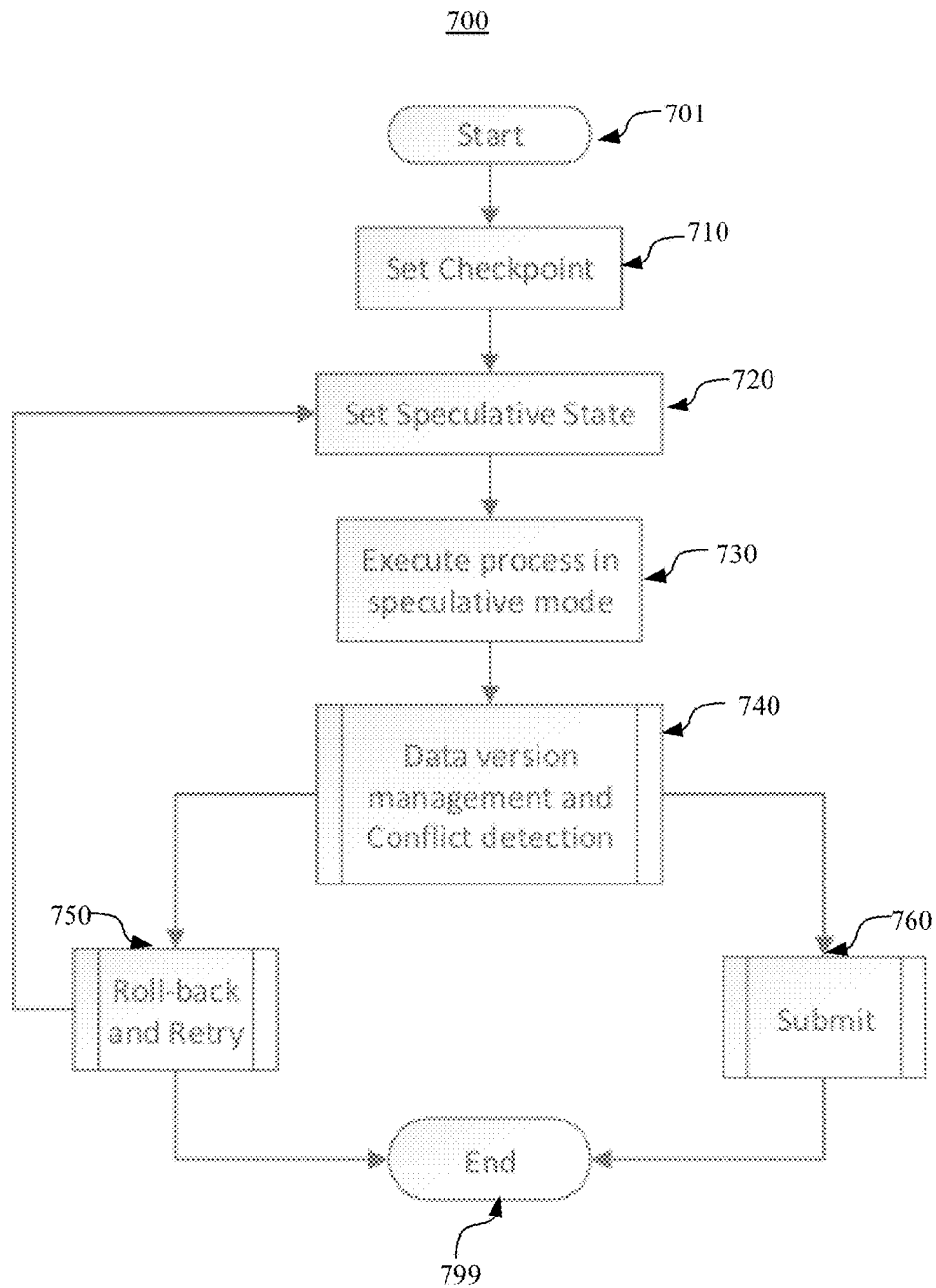
FIG. 7 illustrates an example method of speculative execution management in a coherent accelerator architecture, according to embodiments.

FIG. 7 illustrates an example method 700 of speculative execution management in a coherent accelerator architecture, according to embodiments. Aspects of method 700 relate to establishing checkpoints with respect to a single shared memory in a coherent accelerator architecture. The method 700 may begin at block 701. At block 710, a checkpoint may be established to capture the state of the single shared memory at a particular time. At block 720, a speculative execution management engine may be configured to initiate a speculative execution technique. At block 730, one or more access requests (e.g., received from components connected to the coherent accelerator architecture) may be detected and processed using the speculative execution technique. For instance, performance of multiple access requests may be initiated with respect to cache lines of the set of memory spaces of the single shared memory (e.g., at substantially the same time). At block 740, the set of access requests may be evaluated to ascertain whether a conflict has occurred with respect to the single shared memory (e.g., multiple access requests target the same cache line(s) of the single shared memory). At block 750, in the event that a conflict is detected with respect to the shared memory, the single shared memory may be rolled-back to the state indicated by the checkpoint (e.g., captured at block 710), and the method 700 may return to block 720 to be repeated. In the event that a conflict is not detected with respect to the shared memory, the cache lines modified by the access requests may be submitted to a host memory directory at block 760. The method 700 may conclude at block 799.

Consider the following example. A first component may request to read the data in cache line 40. After completion of the read access request, the read bit of cache line 40 may be set to a value of "1." Subsequent to completion of the read access request, a second component may request to write data to cache line 40. In response to receiving the write access request, a cache manager may detect that the read bit of cache line 40 is "1," the write bit of this cache line is "0," and the new access request is a write behavior request. Accordingly, the cache manager may determine a conflict presence including a read-write conflict, as the second component is attempting to write to cache line 40 after the first component read from cache line 40 in the same task process (e.g., before cache line 40 has been written to main system memory).

Figure 8:
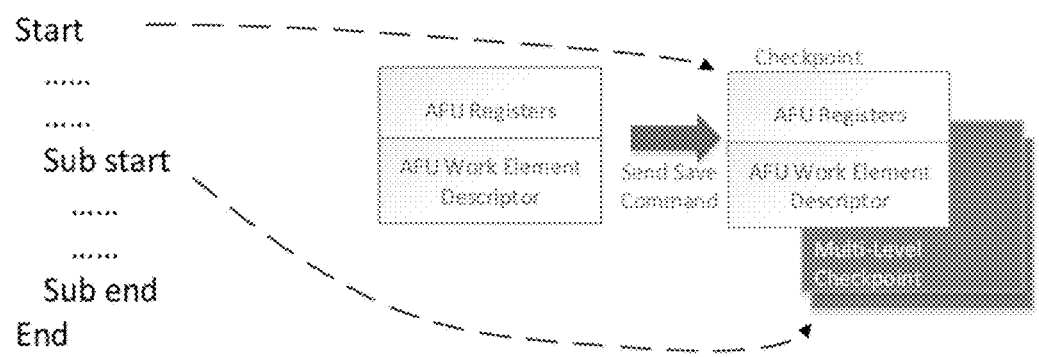
FIG. 8 illustrates an example system of checkpoint setting for speculative execution management in a coherent accelerator architecture, according to embodiments.

FIG. 8 illustrates an example system 800 of checkpoint setting for speculative execution management in a coherent accelerator architecture, according to embodiments. Aspects of FIG. 8 relate to establishing checkpoints with respect to the single shared memory of the coherent accelerator infrastructure to facilitate data recovery in the event of a conflict (e.g., multiple components attempting to modify the same cache lines). The checkpoint may include a collection of information that characterizes the state of the set of memory spaces of the single shared memory unit at a particular point in time. In embodiments, the checkpoint may be established at initiation of the speculative execution technique in the coherent accelerator architecture. The checkpoint may take a snapshot of a function unit for a work elements descriptor. In embodiments, aspects of the disclosure relate to making use of multi-level checkpoints to facilitate multi-level speculative execution. For instance, multiple checkpoints may be established for the coherent accelerator architecture to allow for layered operations with respect to the single shared memory (e.g., multiple sets of access requests may be performed in parallel). Other types of systems for setting checkpoints for speculative execution management in the coherent accelerator architecture are also possible.

Figure 9:
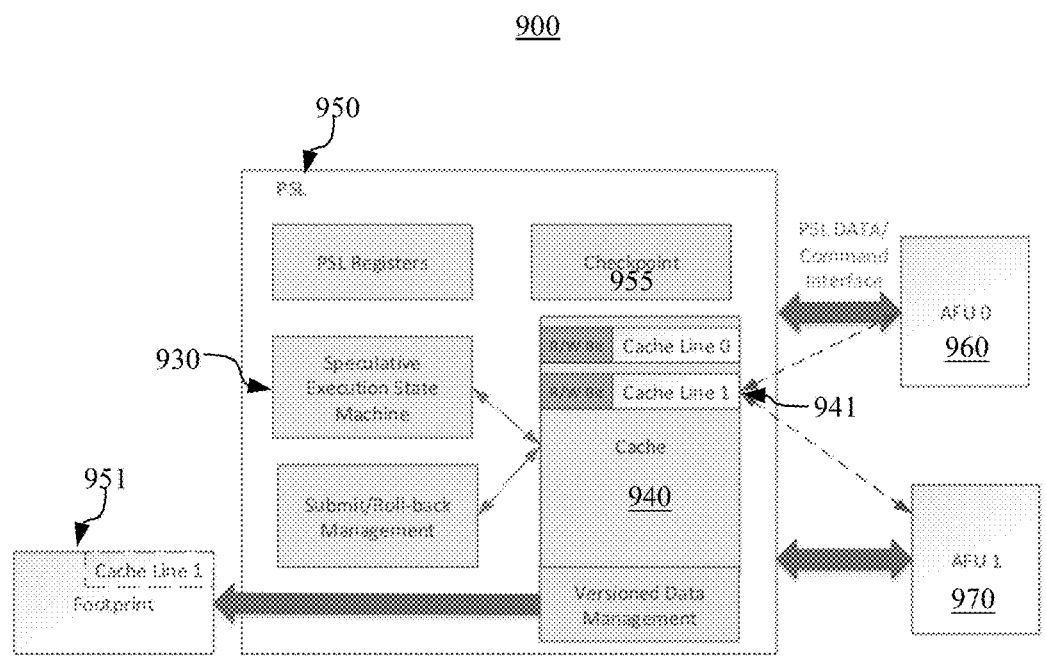
FIG. 9 illustrates an example system of speculative execution management in a coherent accelerator architecture, according to embodiments.

FIG. 9 illustrates an example system 900 of speculative execution management in a coherent accelerator architecture, according to embodiments. Aspects of the example system 900 relate to implementing a speculative execution technique to facilitate parallel processing of multiple access requests with respect to the single shared memory of the coherent accelerator architecture. The coherent accelerator interface 950 may detect a first access request from a first functional unit 960 and a second access request from a second functional unit 970. The checkpoint module 955 may establish a checkpoint for the cache 940 by capturing a snapshot of the state of the cache at the time the first and second access requests are detected. For instance, a cache line 1 footprint 951 (e.g., undo log entry which records values to system memory) may be stored to record the state of cache line 1 941 at the time the first and second access requests are detected. The speculative execution state machine 930 may initiate a speculative execution technique to allow for both the first and second access requests to be performed with respect to cache lines of the cache 940. In embodiments, as described herein, a conflict may be detected with respect to cache line 1 941 (e.g., both the first and second access requests targeted cache line 1, resulting in a read-write conflict, a write-read conflict, or a write-write conflict). In embodiments, cache line 1 941 may be invalidated and the first and second access requests may be retried (e.g., the coherent accelerator interface 950 may fetch cache line 1 941 from main system memory using footprint 951 the next time it is necessary). Other methods of speculative execution management in a coherent accelerator architecture are also possible.

Figure 10:
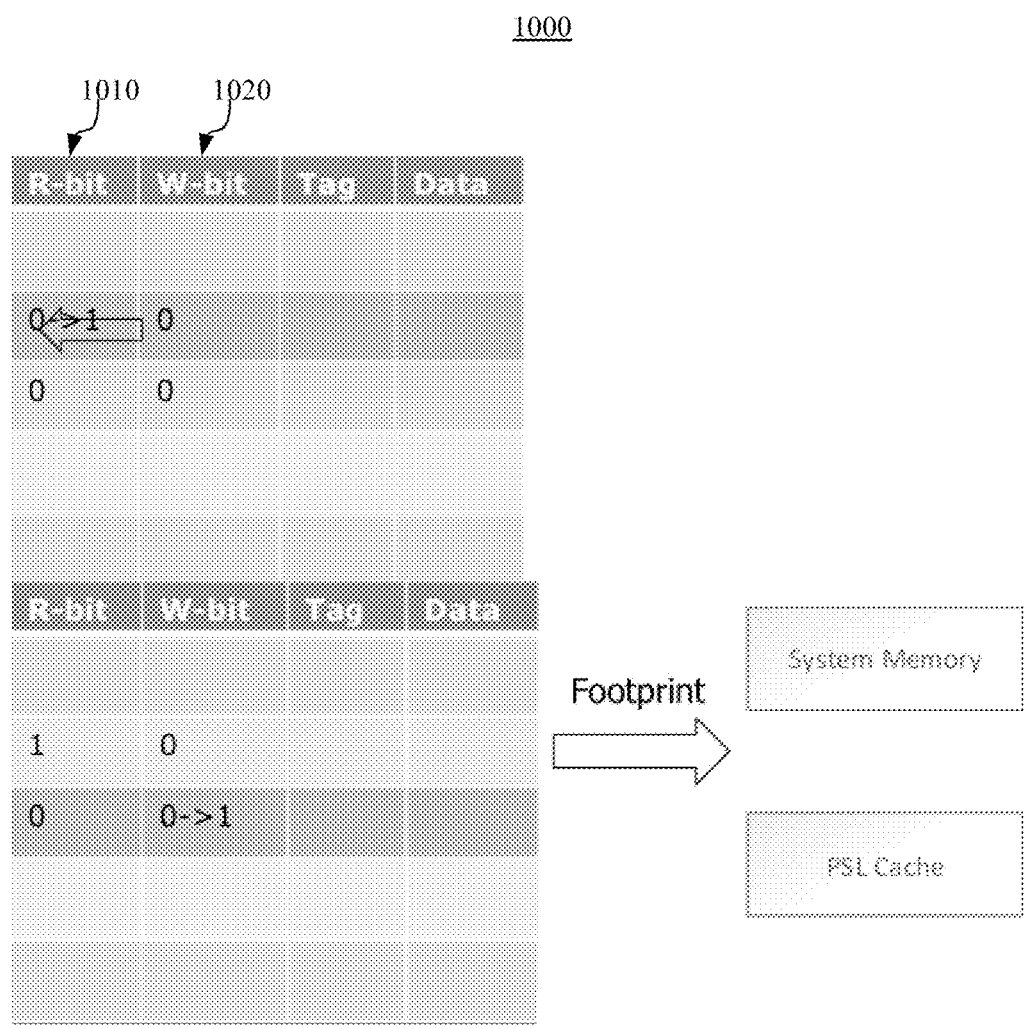
FIG. 10 illustrates an example of a cache line for speculative execution management in a coherent accelerator architecture, according to embodiments.

FIG. 10 illustrates an example of a cache line 1000 for speculative execution management in a coherent accelerator architecture, according to embodiments. Aspects of FIG. 10 relate to managing a set of read bits 1010 and a set of write bits 1020 of the cache line 1000 to detect conflicts with respect to the single shared memory of the coherent accelerator architecture. The set of read bits 1010 may be used to record the read behavior of the cache line 1000, and the set of write bits 1020 may be used to record the write behavior of the cache line 1000. The cache line 1000 may be part of a data buffer (e.g., cache memory) of a Power Service Layer (PSL) of the coherent accelerator architecture. In embodiments, read bits of the set of read bits 1010 may be configured to change from a value of "0" to a value of "1" in the event of a read request, and write bits of the set of write bits 1020 may be configured to change from a value of "0" to a value of "1" in the event of a write request. In certain embodiments, a cache manager may evaluate the set of read bits 1010 and the set of write bits 1020, identify a subset of read bits that have been previously read and a subset of write bits that have been previously written, and transfer the identified subsets of read and write bits to the host memory directory. In embodiments, the cache manager may examine the set of read bits 1010 and the set of write bits 1020 to ascertain whether one or more read or write bits is the target of multiple access requests (e.g., read or write requests). As examples, a shared request of "1" to a write bit may indicate a read-write conflict, an exclusive request of "1" to a read bit may indicate a write-read conflict, and an exclusive request of "1" to a write bit may indicate a write-write conflict. Accordingly, in response to detecting one or more such requests, a conflict may be determined with respect to that cache line 1000. Other types of cache lines are also possible.

Figure 11:
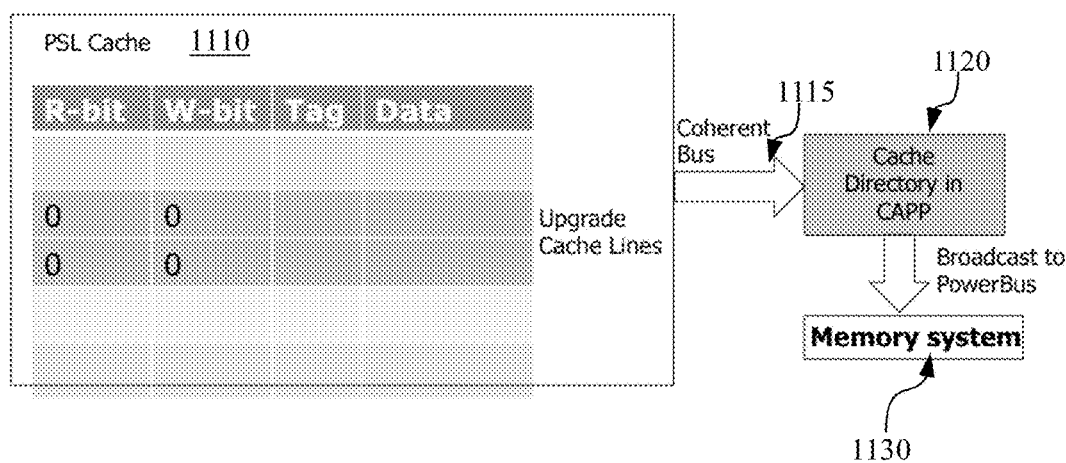
FIG. 11 illustrates an example system of a data submission process for speculative execution management in a coherent accelerator architecture, according to embodiments.

FIG. 11 illustrates an example system of a data submission process 1100 for speculative execution management in a coherent accelerator architecture, according to embodiments. Aspects of FIG. 11 relate to transferring data from the single shared memory of the coherent accelerator architecture to a host memory directory where it may be accessed by other system components and processes. As shown in FIG. 11, a Power Service Layer (PSL) cache 1110 may be communicatively connected to a cache directory 1120 via a coherent bus 1115. In response to completing a speculative execution operation without encountering a conflict (e.g., write-read conflict, read-write conflict, write-write conflict) with respect to the PSL cache 1110, the cache lines modified by the access requests may be transferred via the coherent bus 1115 to the cache directory 1120, and subsequently stored in the memory system 1130. The read and write bits of the PSL cache 1110 may be reset, and the state of the relevant cache lines may be updated. In certain embodiments, submitting data from the PSL cache 1110 to the memory system 1130 may be performed in a batch fashion to transfer the cache data to the memory system 1130 as a single set of data traffic. Other methods of submitting data for speculative execution management in a coherent accelerator architecture are also possible.

Figure 12:
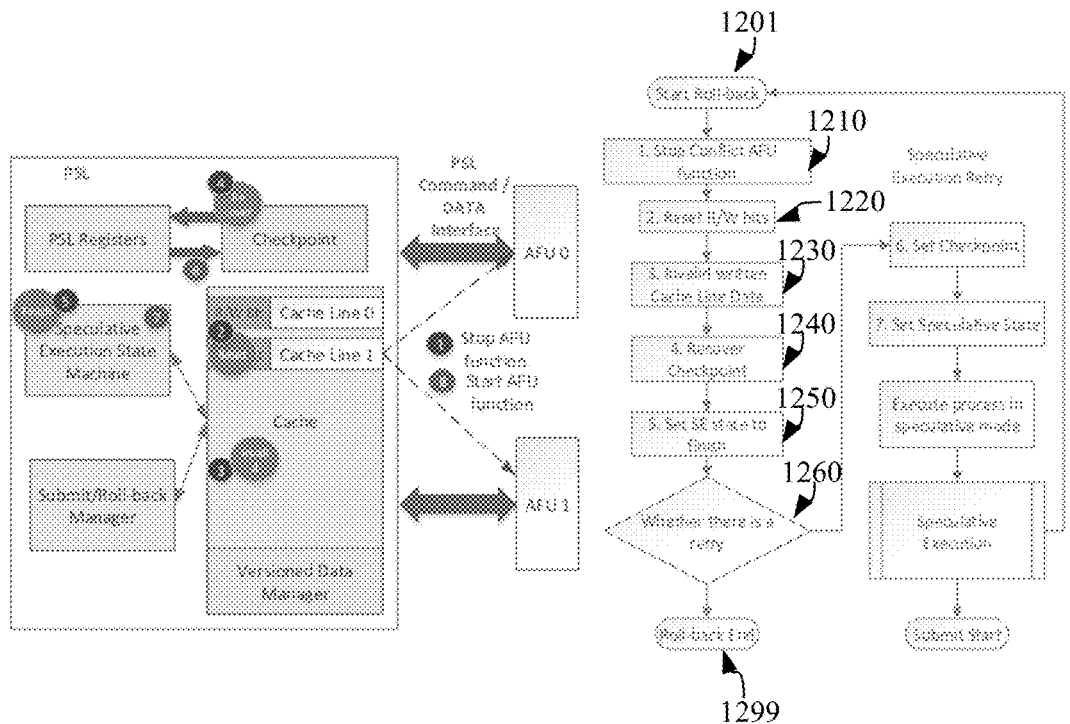
FIG. 12 illustrates an example method of rolling-back a single shared memory for speculative execution management in a coherent accelerator architecture, according to embodiments.

FIG. 12 illustrates an example method 1200 of rolling-back a single shared memory for speculative execution management in a coherent accelerator architecture, according to embodiments. Aspects of method 1200 relate to rolling-back a single shared memory to a previous state in response to detecting a conflict with respect to a set of memory spaces of the single shared memory. The method 1200 may begin at block 1201. At block 1210, in response to detecting a conflict with respect to one or more memory spaces of the single shared memory, the AFU function corresponding to the conflict (e.g., access request) may be stopped (e.g., terminated, ceased). At block 1220, the read and write bits of memory spaces affected by the conflict may be reset. At block 1230, cache line data written by the access requests associated with the conflict may be invalidated. At block 1240, a checkpoint (e.g., as shown in FIG. 800 and elsewhere herein) may be recovered to roll-back the single shared memory to a previous state (e.g., before the conflict, before the access requests were processed). At block 1250, the speculative execution operation may be disabled. At block 1260, it may be ascertained whether the access requests should be retried. In the event that it is determined that the access request should be retried, the method may proceed to set a new checkpoint and repeat the access request processing operations with respect to the single shared memory. In the event that the a retry is not necessary, the roll-back process may end at block 1299. Other methods of rolling-back a single shared memory to a previous state in response to detecting a conflict with respect to a set of memory spaces of the single shared memory are also possible.

Figure 13:
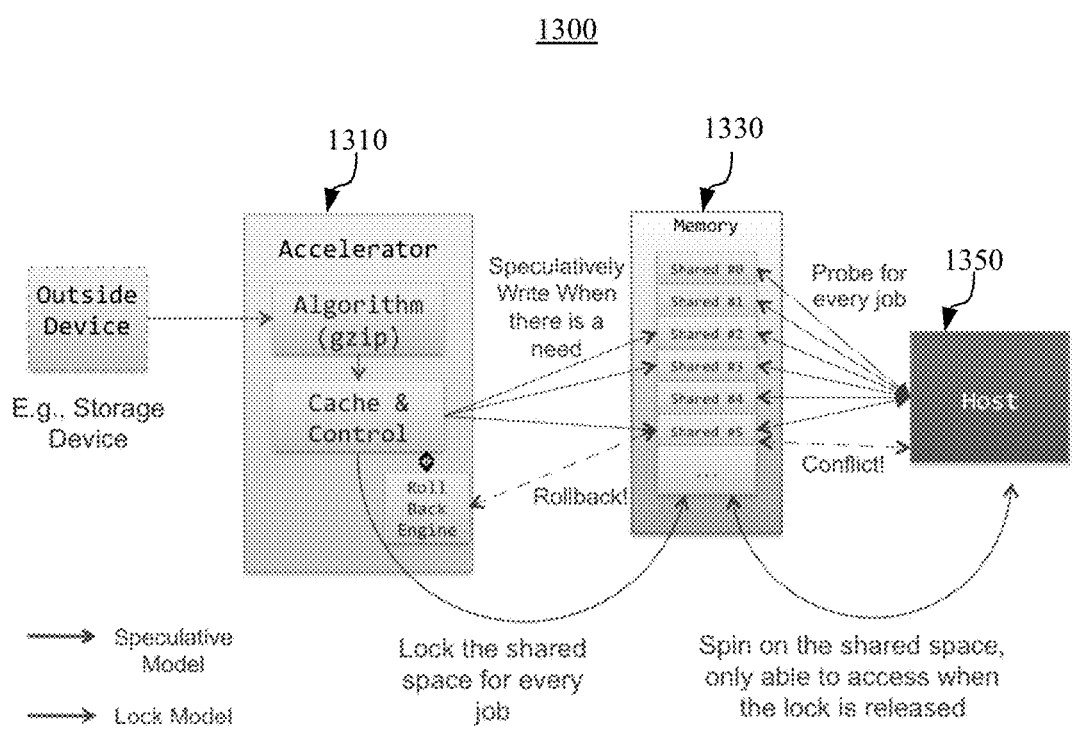
FIG. 13 illustrates an example system for speculative execution management in a coherent accelerator architecture, according to embodiments.

FIG. 13 illustrates an example system 1300 for speculative execution management in a coherent accelerator architecture, according to embodiments. Aspects of system 1300 relate to illustrating an example usage situation of speculative execution management with respect to an accelerator 1310 and a host processor 1350. In embodiments, with respect to the accelerator 1310, a compression algorithm may be performed to compress a job execution log received from a device external to the shared memory space (e.g., storage device). In response to detecting an error event (e.g., conflict) with respect to a job indicated by the job execution log, a corresponding error log may be generated to indicate the nature of the error event. In embodiments, the host 1350 may be configured to probe the error log from the shared memory space 1330. As such, utilizing speculative execution management may allow both the accelerator 1310 and host processor 1350 to be free to operate on the shared memory 1330 in a parallel fashion with respect to a speculative execution period (e.g., using the roll-back procedure to revert to a previous state in the event of a conflict). Other types of systems for speculative execution management in a coherent accelerator architecture are also possible.

Figure 14:
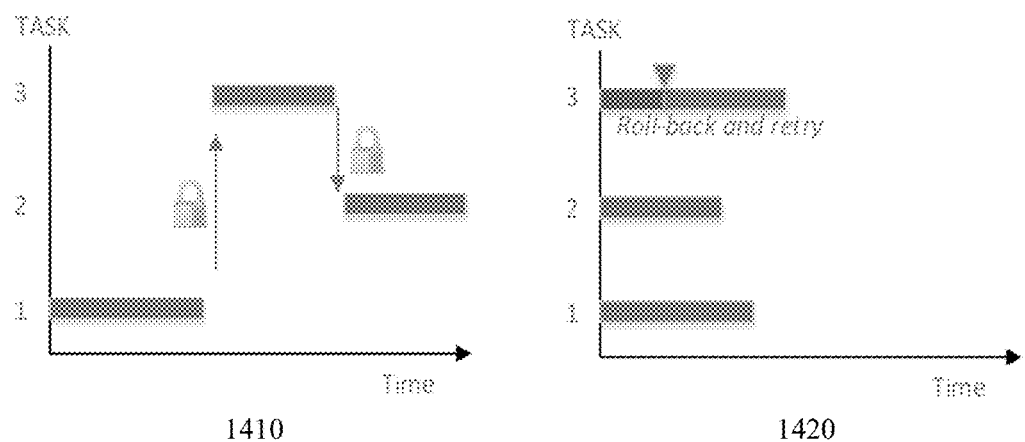
FIG. 14 illustrates an example of speculative execution management in a coherent accelerator architecture, according to embodiments.

FIG. 14 illustrates an example 1400 of speculative execution management in a coherent accelerator architecture, according to embodiments. Aspects of example 1400 relate to illustrating the task flow for a speculative execution management technique 1420 with respect to the task flow for a locking mechanism 1410. As shown in FIG. 14, usage of a locking mechanism 1410 may require performing transactions (e.g., access requests) with respect to a single shared memory (e.g., cache memory) one at a time (e.g., such that tasks have to wait in queues/buffers for their turn to be processed). Accordingly, aspects of the disclosure relate to leveraging a speculative execution management technique 1420 to allow for transactions to be carried out in parallel with respect to the single shared memory (e.g., saving the time of queuing/buffering the transactions until they can be processed). Altogether, leveraging the speculative execution technique with respect to a coherent accelerator architecture context may be associated with benefits for cache availability, access request performance, and coherent accelerator resource usage efficiency.

Figure 15:
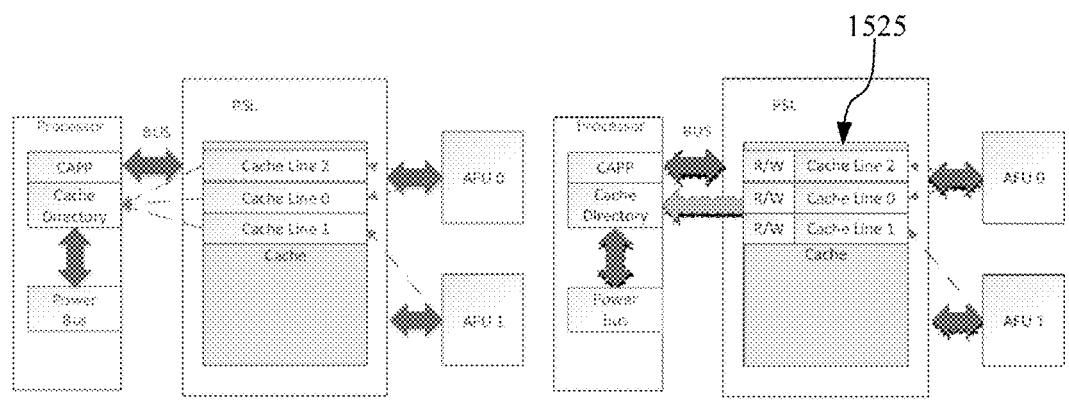
FIG. 15 illustrates an example system for speculative execution management in a coherent accelerator architecture, according to embodiments.

FIG. 15 illustrates an example system 1500 for speculative execution management in a coherent accelerator architecture, according to embodiments. Aspects of the example system 1500 relate to writing modified cache lines back to system memory in a batch fashion. As described herein, batch fashion may refer to a technique for transferring (e.g., copying) a plurality of data entries from the single shared memory to the host memory directory in a batch, bundle, or group (e.g., as opposed to one-by-one). In embodiments, updating the host memory directory in batch fashion may include identifying a set of cache lines 1525 that have been modified by an access request, aggregating a set of data entries from both the modified set of cache lines 1525, and transmitting the data entries to the host memory directory as a single set of data traffic utilizing a coherent bus that facilitates communication between the single shared memory and the host memory directory. Other methods of recording data from the single shared memory to system memory are also possible.

In addition to embodiments described above, other embodiments having fewer operational steps, more operational steps, or different operational steps are contemplated. Also, some embodiments may perform some or all of the above operational steps in a different order. The modules are listed and described illustratively according to an embodiment and are not meant to indicate necessity of a particular module or exclusivity of other potential modules (or functions/purposes as applied to a specific module).

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

Embodiments of the present disclosure may also be delivered as part of a service engagement with a client corporation, nonprofit organization, government entity, internal organizational structure, or the like. These embodiments may include configuring a computer system to perform, and deploying software, hardware, and web services that implement, some or all of the methods described herein. These embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to exemplary embodiments, other and further embodiments of the invention may be devised without departing from the basic scope thereof, and the scope thereof is determined by the claims that follow. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. "Set of," "group of," "bunch of," etc. are intended to include one or more. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of exemplary embodiments of the various embodiments, reference was made to the accompanying drawings (where like numbers represent like elements), which form a part hereof, and in which is shown by way of illustration specific exemplary embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

What is claimed is:

1. A computer-implemented method for speculative execution management in a coherent accelerator architecture, the method comprising:
    detecting, with respect to a set of cache lines of a single shared memory in the coherent accelerator architecture, a first access request from a first Accelerator Functional Unit (AFU);
    detecting, with respect to the set of cache lines of the single shared memory in the coherent accelerator architecture, a second access request from a second AFU; and
    processing, by a speculative execution management engine using a speculative execution technique, the first and second access requests with respect to the set of cache lines of the single shared memory in the coherent accelerator architecture, wherein the speculative execution technique is configured to allow both the first and second AFU's to simultaneously access the set of cache lines without a locking mechanism;
    determining a number of data entries in the set of cache lines of the single shared memory;
    comparing the number of data entries in the set of cache lines of the single shared memory to a threshold number of data entries;
    determining an elapsed period since a previous capture on the set of cache lines of the set of single shared memory;
    comparing the elapsed period since the previous capture to a time threshold;
    capturing, in response to the number of data entries exceeding the threshold number of data entries and in response to the elapsed period exceeding the time threshold, by the speculative execution management engine, a set of checkpoint roll-back data, wherein the set of checkpoint roll-back data includes an image of the first AFU at a first point in time, an image of the second AFU at the first point in time, and an image of the set of cache lines of the single shared memory at the first point in time;
    evaluating the first and second access requests, wherein evaluating the first and second access requests further comprises:
        identifying a first subset of target cache lines of the set of cache lines for the first access request;
        identifying a second subset of target cache lines of the set of cache lines for the second access request, wherein the first and second subsets of target cache lines indicate read and write operations by the first and second access requests; and
        determining, based on the identified first and second subset of target cache lines, whether a conflict exists;
    in response to a determination that a conflict does not exist:
        updating, in response to processing the first and second access requests with respect to the set of cache lines of the single shared memory in the coherent accelerator architecture, a host memory directory in a batch fashion which includes a set of update data for both the first and second access requests in a single set of data traffic; and
    in response to a determination that a conflict exists:
        identifying a subset of cache lines of the set of cache lines where the conflict exists;
        determining a number of cache lines in the subset of cache lines;
        comparing the number of cache lines to a severity threshold;
        rolling-back, in response to the number of cache lines exceeding the severity threshold, based on the set of checkpoint roll-back data, the coherent accelerator architecture to a prior state, wherein the rolling-back includes rolling back only the subset of cache lines where the conflict exists;
        retrying, without using the speculative execution technique and in a separate fashion in relation to the second access request, the first access request with respect to the set of cache lines of the single shared memory in the coherent accelerator architecture; and
        retrying, without using the speculative execution technique and in the separate fashion in relation to the first access request, the second access request with respect to the set of cache lines of the single shared memory in the coherent accelerator architecture.

* * * * *